United States Patent
Chen et al.

(10) Patent No.: US 11,600,912 B2
(45) Date of Patent: Mar. 7, 2023

(54) ANTENNA DEVICE AND MANUFACTURING METHOD THEREOF

(71) Applicants: Au Optronics Corporation, Hsinchu (TW); SES RFID Solutions GmbH, Dusseldorf (DE)

(72) Inventors: Chung-Hung Chen, Hsinchu (TW); Yi-Cheng Lai, Hsinchu (TW); Hsiang-Chi Cheng, Hsinchu (TW); Shyh-Bin Kuo, Hsinchu (TW); Martin Jeffrey Scattergood, Dusseldorf (DE)

(73) Assignees: Au Optronics Corporation, Hsinchu (TW); SES RFID Solutions GmbH, Dusseldorf (DE)

( * ) Notice: Subject to any disclaimer, the term of this patent is extended or adjusted under 35 U.S.C. 154(b) by 189 days.

(21) Appl. No.: 17/114,509

(22) Filed: Dec. 8, 2020

(65) Prior Publication Data

US 2021/0184342 A1  Jun. 17, 2021

Related U.S. Application Data

(60) Provisional application No. 62/947,026, filed on Dec. 12, 2019.

(30) Foreign Application Priority Data

Sep. 23, 2020 (TW) ................................ 109132866

(51) Int. Cl.
*H01Q 1/24* (2006.01)
*H01Q 1/38* (2006.01)
(Continued)

(52) U.S. Cl.
CPC ......... *H01Q 1/38* (2013.01); *G06K 19/07749* (2013.01); *H01Q 1/2225* (2013.01)

(58) Field of Classification Search
CPC ....... G06K 19/07749; G06K 19/07783; H01Q 1/005; H01Q 1/2225; H01Q 1/38; H04B 5/0025
See application file for complete search history.

(56) References Cited

U.S. PATENT DOCUMENTS 6,049,461 A * 4/2000 Haghiri-Tehrani ......................... G06K 19/07749
257/679
6,095,424 A * 8/2000 Prancz ............. G06K 19/07724
257/679

(Continued)

FOREIGN PATENT DOCUMENTS

| CN | 1183485 | 1/2005 |
| CN | 1606036 | 4/2005 |

(Continued)

*Primary Examiner* — Thien M Le
(74) *Attorney, Agent, or Firm* — JCIPRNET

(57) ABSTRACT

An antenna device includes a substrate, a chip, and an antenna. The chip is disposed on the substrate, and the chip has at least two pads. The antenna is disposed on the substrate, and the chip is disposed between the substrate and the antenna. The antenna has a first bonding line segment and a second bonding line segment electrically connected to the at least two pads respectively. The first bonding line segment is located at an outermost coil of the antenna, and is disposed across a short side direction of the chip in a manner of completely covering one of the at least two pads. The second bonding line segment is located at an innermost coil of the antenna, and is disposed across the short side direction of the chip in a manner of completely covering another of the at least two pads.

19 Claims, 22 Drawing Sheets

(51) Int. Cl.
  *H01Q 1/22*    (2006.01)
  *G06K 19/077*  (2006.01)

(56)          References Cited

U.S. PATENT DOCUMENTS 6,468,835 B1    10/2002  Blanc et al.
     6,943,437 B2     9/2005  Blanc et al.
     7,141,451 B2    11/2006  Tsunoda et al.
  2005/0275497 A1*  12/2005  Ramadan ............ H01L 23/5227
                                                       336/200
  2006/0028379 A1*   2/2006  Oberle .................. H05K 3/242
                                                       343/700 MS
  2015/0145742 A1*   5/2015  Cao ......................... H01Q 7/00
                                                       343/788
  2017/0092612 A1*   3/2017  Zenz .................... H01Q 1/2208
  2018/0226314 A1*   8/2018  Chen ................ H01L 23/49833
  2019/0171923 A1*   6/2019  Finn ................. G06K 19/07794
  2019/0304934 A1*  10/2019  Kamphuis .............. H01Q 21/28
  2019/0355693 A1*  11/2019  Zenz ................ G06K 19/07769

FOREIGN PATENT DOCUMENTS

CN        203606858       5/2014
  CN        208027403      10/2018
  JP        2003011422      1/2003

* cited by examiner

ANTENNA DEVICE AND MANUFACTURING METHOD THEREOF

CROSS-REFERENCE TO RELATED APPLICATION

This application claims the priority benefits of U.S. provisional application No. 62/947,026, filed on Dec. 12, 2019, and Taiwan application no. 109132866, filed on Sep. 23, 2020. The entirety of each of the above-mentioned patent applications is hereby incorporated by reference herein.

BACKGROUND OF THE INVENTION

Field of the Invention

The invention relates to a wireless communication device, and particularly relates to an antenna device and a manufacturing method thereof.

Description of Related Art

Radio-frequency identification (RFID) devices are convenient. With the advance of time, RFID devices are widely used in various fields, such as logistics management, warehouse management, or identification.

However, in some RFID devices, since an antenna substrate is used to carry an antenna, and there is a gap between an integrated circuit (IC) chip and the antenna substrate, the overall thickness of the RFID devices is greater and the RFID devices are prone to issues such as cracking of the IC chip and breakage of the contact of the antenna and the chip. In addition, if an IC chip such as a flexible integrated circuit chip or a plastic integrated circuit chip is used in the RFID devices, in the manufacturing process, when the integrated circuit chip is bonded to the antenna substrate, greater pressure and longer bonding time are needed than a conventional integrated circuit chip. As a result, there is excessive pressure, thus resulting in issues such as the chip is readily cracked, the antenna is readily disconnected, and the thermocompression bonding process takes longer. Therefore, a method solving the above issues is urgently needed.

SUMMARY OF THE INVENTION

The invention provides an antenna device that may prevent issues such as chip cracking and antenna disconnection.

The invention also provides a manufacturing method of an antenna device that may manufacture an antenna device to prevent issues such as chip cracking and antenna disconnection, thereby improving the yield of the antenna device.

At least one embodiment of the invention provides an antenna device including a substrate, a chip, and an antenna. The chip is disposed on the substrate, and the chip has at least two pads. The antenna is disposed on the substrate, and the chip is disposed between the substrate and the antenna. The antenna has a first bonding line segment and a second bonding line segment electrically connected to the at least two pads respectively. The first bonding line segment is located at an outermost coil of the antenna, and is disposed across a short side direction of the chip in a manner of completely covering one of the at least two pads. The second bonding line segment is located at an innermost coil of the antenna, and is disposed across the short side direction of the chip in a manner of completely covering another of the at least two pads.

At least one embodiment of the invention provides a manufacturing method of an antenna device including steps such as a substrate preparation step, a chip placing step, and an antenna forming step. A substrate is formed in the substrate preparation step. In the chip placing step, the substrate is moved in a roll-to-roll manner, the chip is placed on the substrate, and the chip has at least two pads. In addition, there is an included angle between a short side direction of the chip and a moving direction of the substrate, wherein the included angle is less than or equal to 45 degrees. In the antenna forming step, an antenna is formed on the substrate, and the chip is located between the substrate and the antenna. In addition, the antenna has a first bonding line segment and a second bonding line segment electrically connected to the at least two pads, respectively, wherein the first bonding line segment is located at an outermost coil of the antenna, and is disposed across a short side direction of the chip in a manner of completely covering one of the at least two pads; and the second bonding line segment is located at an innermost coil of the antenna and is disposed across the short side direction of the chip in a manner of completely covering another of the at least two pads.

In order to make the aforementioned features and advantages of the disclosure more comprehensible, embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
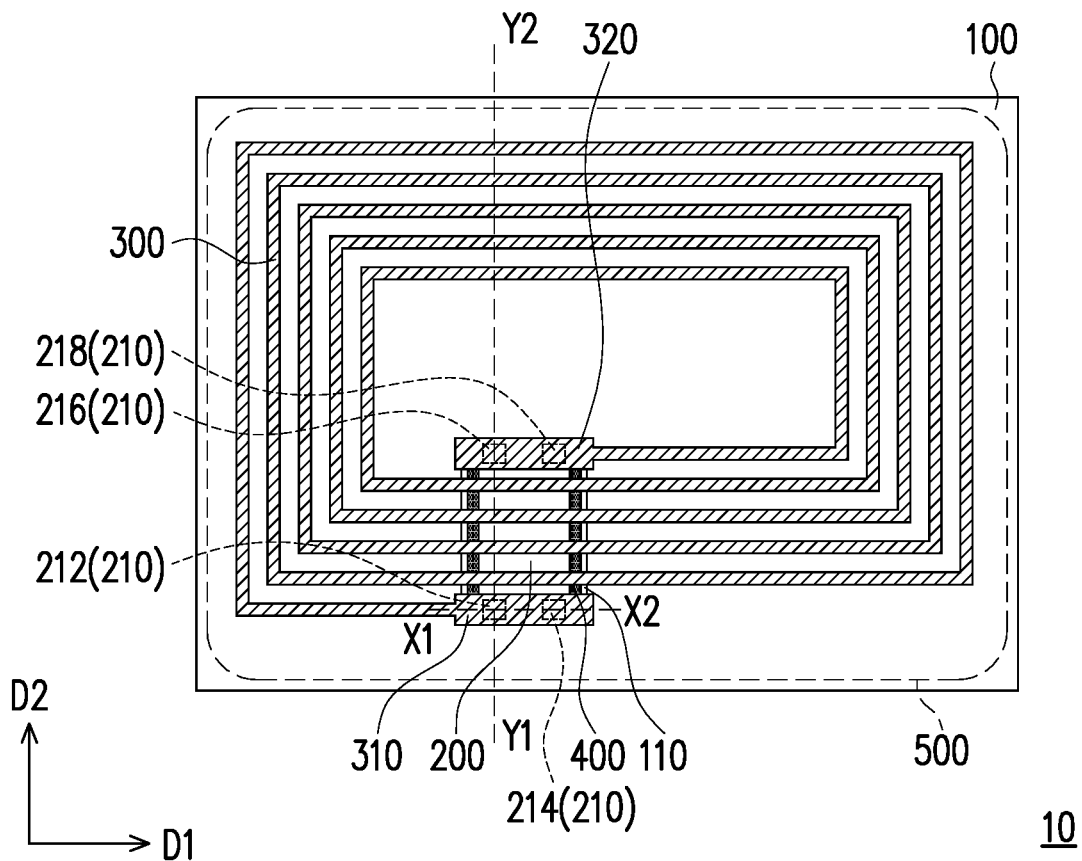
FIG. 1A is a top view of an antenna device according to the first embodiment of the invention.

In the entire specification, the same reference numerals represent the same or similar components. In the figures, for clarity, the thicknesses of, for example, layers, films, panels, and regions are enlarged. It should be understood that when an element such as a layer, film, region, or substrate is referred to as being "on another element," it may be directly on the other element, or intervening elements may also be present. When two elements are "electrically connected" to each other, other elements may be present between the two elements.

It should be understood that, even though terms such as "first", "second", etc., in the specification may be used herein to describe various components, members, regions, layers, and/or parts, these components, members, regions, and/or parts should not be limited by these terms. These terms are only used to distinguish one component, member, region, layer, or part from another component, member, region, layer, or part.

The terminology used here is only for the object of describing specific embodiments and is not limiting. As used herein, unless the content clearly indicates otherwise, the singular form "one" is intended to include the plural form, including "at least one." "One of at least two" is intended to mean at least a part of the plural form, the number of which may be singular or plural, and "the other of the at least two" means another part other than the aforementioned part, the number of which may also be singular or plural. "Or" means "and/or". It should also be understood that when used in the specification, the term "including" and/or "containing" specifies the stated features, regions, wholes, steps, operations, presence of elements and/or components, but does not exclude the presence or addition of one or a plurality of other features, regions, wholes, steps, operations, elements, components, and/or a combination thereof.

In addition, relative terms such as "lower" or "bottom surface" and "upper" or "top surface" may be used herein to describe the relationship of one element to another element as shown in the figures. It should be understood that relative terms are intended to encompass different orientations of the device in addition to the orientation shown. For example, if the device in one figure is turned over, an element described as being on the "lower" side of the other elements is oriented to being on the "upper" side of the other elements. Thus, the exemplary term "below" may include the orientations "below" and "above", depending on the particular orientation of the figures. Similarly, if the device in one figure is turned over, an element described as "below" other elements or an element "below" is oriented "above" the other elements. Thus, the exemplary term "above" or "below" may encompass the orientations of above and below.

"About" or "substantially" used in the specification includes the value and the average value within an acceptable deviation range of a specific value confirmed by those having ordinary skill in the art, and the concerned measurement and a specific quantity (i.e., limitations of the measuring system) of measurement-related errors are taken into consideration. For example, "about" or "substantially" may mean within one or a plurality of standard deviations of the stated value, or within ±30%, 20%, 10%, 5%. Moreover, "about" or "substantially" used in the specification may include a more acceptable deviation range or standard deviation according to optical properties, etching properties, or other properties, and one standard deviation does not need to apply to all of the properties.

Unless otherwise stated, all of the terminology used in the present specification (including technical and scientific terminology) have the same definition as those commonly understood by those skilled in the art of the invention. It should be further understood that, terminology defined in commonly-used dictionaries should be interpreted to have the same definitions in related art and in the entire specification of the invention, and are not interpreted as ideal or overly-formal definitions unless clearly stated as such in the present specification.

Figure 1B:
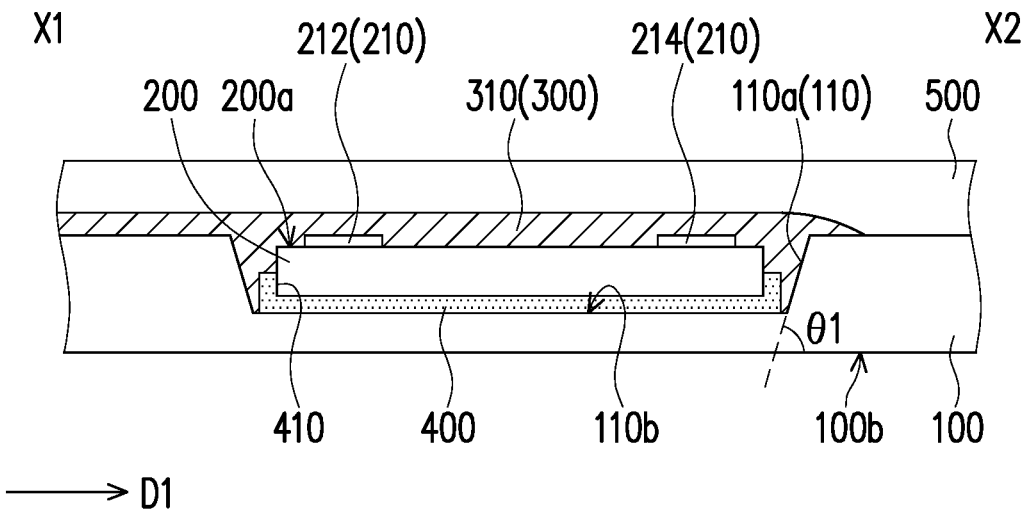
FIG. 1B is a partial cross-sectional view of line X1-X2 of FIG. 1A.
Figure 1C:
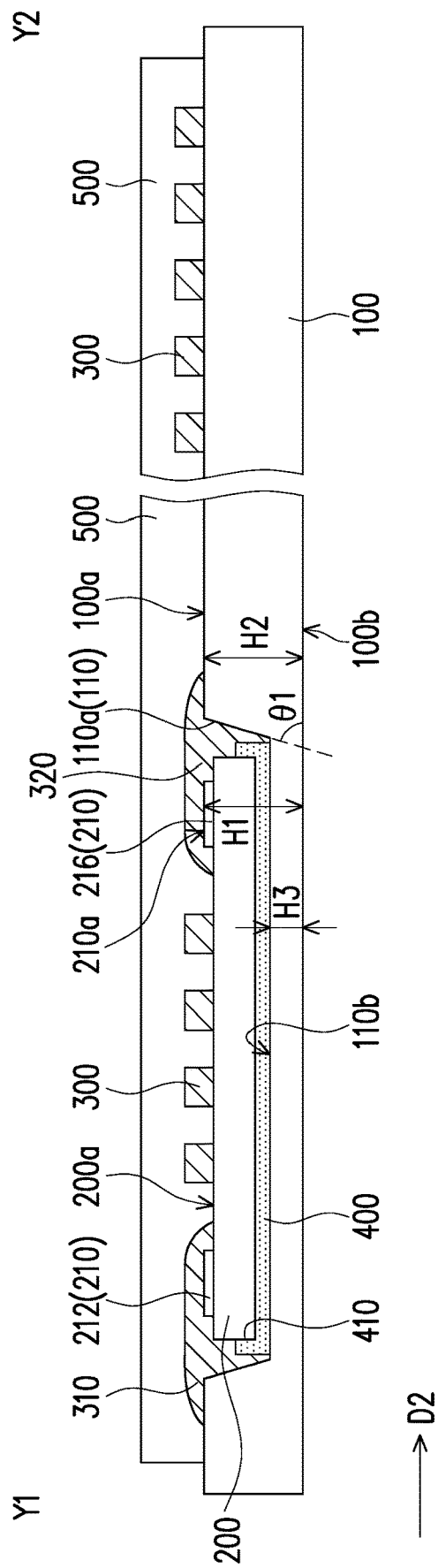
FIG. 1C is a cross-sectional view of line Y1-Y2 of FIG. 1A.

FIG. 1A is a top view of an antenna device according to the first embodiment of the invention; FIG. 1B is a partial cross-sectional view along line X1-X2 in FIG. 1A; FIG. 1C is a cross-sectional view along line Y1-Y2 of FIG. 1A. For the convenience of description, the positions of a first pad 212, a second pad 214, a third pad 216, and a fourth pad 218 are indicated by dotted lines in FIG. 1A. In order to make the figure clearer, another dotted line is used to indicate the position of a protective layer 500.

Referring to FIG. 1A to FIG. 1C, an antenna device 10 includes a substrate 100, a chip 200, and an antenna 300. The chip 200 is located between the substrate 100 and the antenna 300, and the chip 200 is bonded to the antenna 300 via a pad 210 disposed on an active surface 200a thereof. Specifically, as shown in FIG. 1B, the chip 200 is disposed on the substrate 100 with the active surface 200a facing upward (that is, the back surface of the chip 200 faces the substrate 100), the antenna 300 is disposed on the substrate 100 and the chip 200, and the antenna 300 is disposed and bonded to the chip 200.

The substrate 100 may be a flexible substrate. In the present embodiment, the material of the substrate 100 may include paper, polyethylene terephthalate (PET), polyvinyl chloride (PVC), plastic film, or other suitable materials, etc. Those skilled in the art may select the material of the substrate 100 according to design requirements, and the invention is not limited thereto. For example, when the antenna device 10 is used on a packaging box (such as a milk box, a paper bag, a biscuit bag, etc.), the substrate 100 is, for example, a base (such as paper, kraft paper, plastic, etc.) used to form a packaging box.

The chip 200 may include two or more pads 210, wherein the pads 210 are disposed on the active surface 200a of the chip 200. For example, the pads 210 include a first pad 212, a second pad 214, a third pad 216, and a fourth pad 218, for example. Referring to FIG. 1B, in a short side direction D1 of the chip 200, the first pad 212 and the second pad 214 are, for example, located on a short side of the active surface 200a, and are respectively disposed at two ends adjacent to the long side of the chip 200 along the short side direction D1, and the first pad 212 and the second pad 214 are overlapped in the outermost coil of the antenna 300 in the top view direction. In the present embodiment, the third pad 216 and the fourth pad 218 may be disposed on another short side of the chip 200, wherein the third pad 216 and the fourth pad 218 are respectively disposed at two ends adjacent to the long side of the chip 200 along the short side direction D1 (as shown in FIG. 1A), and the third pad 216 and the fourth pad 218 are overlapped in the innermost coil of the antenna 300 in the top view direction. It should be noted that although the number of pads on each short side of the chip shown in FIG. 1B is two as an example, the invention is not limited thereto. In other embodiments, the number of pads at each short side of the chip may also be 1 or greater than or equal to 2, and the type of the pads may also be adjusted according to different electrical connection methods, which is described in detail later. Referring to FIG. 1C, in a long side direction D2 of the chip 200, the third pad 216 is opposite to the first pad 212 and located at an end of the active surface 200a along the long side direction D2, for example. For example, the fourth pad 218 is opposite to the second pad 214 and located at an end of the active surface 200a along the long side direction D2 (as shown in FIG. 1A). In the present embodiment, the chip 200 may be a plastic-based integrated circuit element, that is, a chip type in which active elements and circuits are formed on a flexible substrate such as plastic. The active surface 200a is the forming surface of an integrated circuit including a thin-film transistor TFT. In the present embodiment, the first pad 212, the second pad 214, the third pad 216, and the fourth pad 218 may be used as contacts electrically connected to an internal integrated circuit of the chip 200. The material of the first pad 212, the second pad 214, the third pad 216, and the fourth pad 218 includes a conductive material such as gold, silver, copper, aluminum, molybdenum, titanium, or other metals or alloys containing the above metals.

The antenna 300 is, for example, a spiral coil or other shapes, and two ends of the antenna 300 are respectively electrically connected to the pads 210 of the chip 200. In the present embodiment, the two ends of the antenna 300 are specifically described as follows: one end of the antenna 300 is located on the outermost coil of the antenna and extended from the end of the outermost coil of the coil inward (in the direction of the innermost coil), covers a pad 210 of the chip, and is disposed across a specific line segment at a short side of the chip. Hereinafter, this specific line segment is referred to as a first bonding line segment 310 of the antenna 300. Another end of the antenna 300 is located on the innermost coil of the antenna and extended from the end of the innermost coil of the coil outward (in the direction of the outermost coil), covers another pad 210 of the chip, and is disposed across a specific line segment at another short side of the chip. Hereinafter, this specific line segment is referred to as a second bonding line segment 320 of the antenna 300.

Referring to FIG. 1A, in the top view direction of the antenna device, the first bonding line segment 310 of the antenna 300 located at the outermost coil and the second bonding line segment 320 of the antenna 300 located at the innermost coil are disposed from one long side of the chip 200 across to another long side of the chip 200 by being disposed across the short side direction D1 of the chip 200 continuously and completely, so as to be to respectively be extended at two short sides of the chip 200. Accordingly, the bonding of the antenna and the chip may be less affected by the topography of the bonding surface such as the pads to avoid issues such as disconnection of the antenna. In the present embodiment, the material of the antenna 300 includes a conductive material, such as silver, copper, aluminum, graphene, or other conductive materials. In addition, the width of the first bonding line segment 310 and the second bonding line segment 320 of the antenna 300 may also be greater than the width of other portions of the antenna 300. As shown in FIG. 1A, on the chip 200, compared with other portions of the antenna 300, the first bonding line segment 310 and the second bonding line segment 320 have a larger coverage area in the projection direction of the substrate. Accordingly, the two short sides of the chip 200 may be covered more completely.

In the present embodiment, the first bonding line segment 310 and the second bonding line segment 320 of the antenna 300 completely cover the pads 210 of the chip 200. Furthermore, as shown in FIG. 1A, in the top view direction of the antenna device, the coverage area of the first bonding line segment 310 is larger than the area of the first pad 212 and the second pad 214, and the coverage area of the second bonding line segment 320 is larger than the area of the third pad 216 and the fourth pad 218. Therefore, the contact area between the antenna 300 and the pad 210 of the chip 200 may be increased, thereby ensuring the electrical connection between the antenna 300 and the chip 200, and avoiding defects such as disconnection or antenna cracking when the antenna and the chip are bonded.

In the present embodiment, a groove may be further disposed in the substrate 100. For example, the substrate of a predetermined forming area of the chip may be stamped on the substrate 100 to reduce the thickness of the substrate of the predetermined forming area of the chip so as to form a groove capable of accommodating the chip at the predetermined forming area of the chip. In other embodiments, a groove may also be disposed by forming a printed layer having an opening on the substrate 100, which is described in detail later. In some embodiments, the stamping density of the substrate 100 located at a groove 110 is, for example, greater than the stamping density of the substrate 100 located at the periphery of the groove 110, but the invention is not limited thereto. Referring to FIG. 1B and FIG. 1C, there is an included angle θ1 between a sidewall 110a of the groove 110 and a bottom surface 100b of the substrate 100. For example, the included angle θ1 may be an acute angle, but the invention is not limited thereto.

The chip 200 is, for example, disposed in the groove 110. In FIG. 1C, the description is made with an example in which the depth of the groove 110 is substantially the same as the height of the chip 200. Furthermore, the depth of the groove is not greater than the thickness of the entire substrate, that is, a certain thickness of the substrate 100 is reserved at the bottom portion 110b of the groove 110. In addition, the setting depth of the groove 110 may be adjusted as required. In the present embodiment, the depth of the groove 110 may be set in such a way that a top surface 210a of the pads 210 is substantially aligned with a surface 100a of the substrate 100. Specifically, referring to FIG. 1C, the distance between the top surface 210a of the pads 210 of the chip 200 and the bottom surface 100b of the substrate 100 is set to H1, and the thickness of the substrate 100 located outside the groove 110 is set to H2, then, for example, distance between the top surface 210a of the pads 210 and the surface 100a of the substrate 100 is set to |H1−H2|≤5

μm. In an embodiment, the distance |H1−H2| is set to be substantially 0 μm, for example, that is, the top surface 210a of the pads 210 and the surface 100a of the substrate 100 may be coplanar.

In addition, in the top view of the antenna device, the groove 110 does not penetrate the entire substrate 100. If the distance between the bottom portion 110b of the groove 110 and the bottom surface 100b of the substrate 100 is set as H3, the distance H3 is not 0 μm. In an embodiment, the thickness H2 of the substrate 100 is, for example, 50 μm to 70 μm, and the distance H3 is, for example, 20 μm to 30 μm. The residual thickness of the substrate at the groove may be adjusted according to the strength of the substrate (i.e., the distance H3), but the invention is not limited thereto.

In the present embodiment, the antenna 300 not only completely covers the two short sides of the chip 200, but also completely covers the two short sides of the groove 110, for example. Therefore, the bonding of the antenna and the chip may be prevented from being affected by topography such as a groove, and the antenna may be prevented from defects such as disconnection or cracking.

Based on the above, by disposing the above groove at the substrate, not only may the overall thickness of the antenna device 10 be reduced, issues such as the chip protruding from the substrate and being readily damaged during the manufacturing process and affecting the yield, or the antenna is readily disconnected due to a step between the chip and the substrate may also be prevented. For example, compared to a conventional antenna device (thickness greater than 100 μm), the thickness of the antenna device 10 of the invention only includes the thickness of the substrate 100 and the antenna 300, and therefore the overall thickness of the antenna device 10 may be less than 50 μm. In addition, the step between the chip and the substrate during antenna printing is, for example, 0 μm.

In the present embodiment, an adhesive layer may optionally be included between the substrate 100 and the chip 200. For example, the chip 200 may be attached and fixed on the substrate 100 via an adhesive layer 400. The area of the adhesive layer 400 in the projection direction of the substrate is, for example, greater than or equal to or smaller than the area of the chip 200 in the projection direction of the substrate. In some embodiments, when the area of the adhesive layer 400 in the projection direction of the substrate is greater than the area of the chip 200 in the projection direction of the substrate, the chip 200 is embedded in a portion of the adhesive layer 400. Therefore, the thickness of the adhesive layer 400 located between the substrate 100 and the chip 200 is smaller than that of the adhesive layer 400 located at the periphery of the chip 200. For example, the adhesive layer 400 may further have a groove 410, and the chip 200 is embedded in the groove 410, for example. In this way, the chip 200 may be prevented from falling off the substrate 100. In the present embodiment, the material of the adhesive layer 400 includes, for example, adhesive, such as hot melt adhesive or other suitable adhesive materials, but the invention is not limited thereto.

In an embodiment, when the substrate 100 has the groove 110, the adhesive layer 400 may be located at the bottom portion 110b of the groove 110, and the chip 200 may be attached and fixed in the groove 110.

In the present embodiment, the substrate 100 may optionally include a protective layer, wherein in some embodiment, the term of protective layer may be named as an overlay. For example, on the substrate 100, the protective layer 500 at least covers the area having the chip 200 and the antenna 300. In other words, the protective layer 500 covers the chip 200, the antenna 300, and a portion of the substrate 100. In addition, in the case in which the substrate 100 further has the groove 110, in the top view direction of the antenna device, the coverage area of the protective layer 500 is, for example, larger than the area of the groove 110. Therefore, the chip and the antenna may be protected from being damaged during the manufacturing process, and the antenna may also be prevented from falling off. In the present embodiment, the protective layer 500 includes, for example, a printed protective layer or a printed material, etc. For example, when the antenna device 10 is used on a packaging box, the protective layer 500 may be a printed layer used for the outer layer of the packaging box, that is, a printed material used for printing trademarks and packaging designs, etc. In this way, the manufacturing steps may be simplified to improve process efficiency, and the antenna device may be hidden inside the printed layer by the protective layer, thereby protecting the chip and the antenna from damage.

Figure 1D:
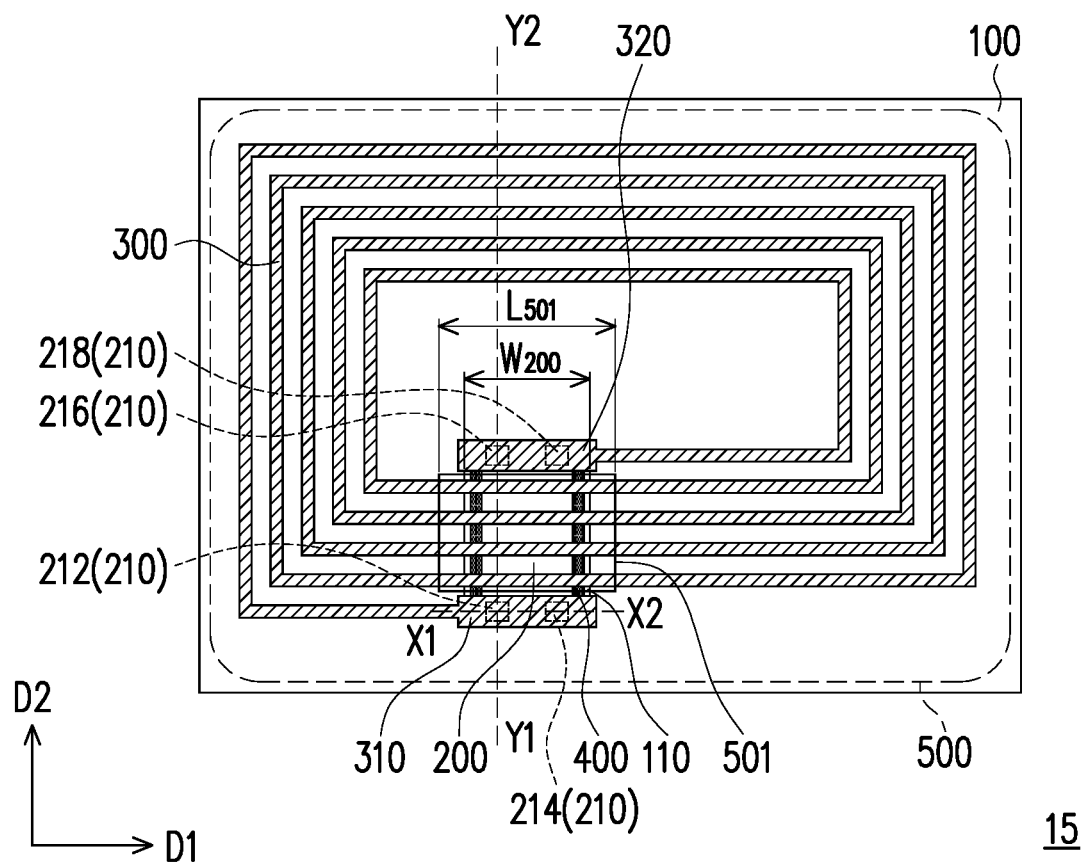
FIG. 1D is a top view of an antenna device according to another embodiment of the first embodiment of the invention.
Figure 1E:
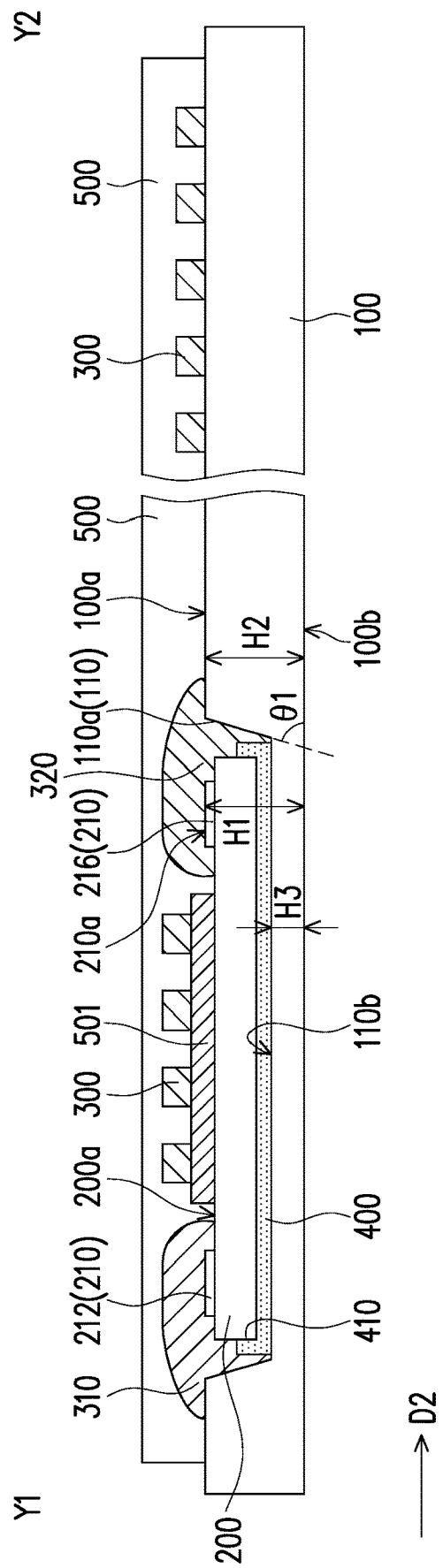
FIG. 1E is a cross-sectional view of line Y1-Y2 of FIG. 1D.

FIG. 1D is a top view of an antenna device according to another embodiment of the first embodiment of the invention; FIG. 1E is a partial cross-sectional view along line Y1-Y2 in FIG. 1D. It should be mentioned here that, the embodiment of FIG. 1D and FIG. 1E adopts the reference numerals of the embodiment of FIG. 1A to FIG. 1C and a portion of the contents thereof, wherein the same or similar numerals are used to represent the same or similar elements, and descriptions of the same technical contents are omitted. The omitted portions are as described in the above embodiments and are not repeated herein.

Referring to FIG. 1D and FIG. 1E, the difference between an antenna device 15 of the present embodiment and the antenna device 10 shown in the FIGS. 1A to 1C is: in the antenna device 15 of the present embodiment, the antenna device 15 further includes an isolation layer 501. As shown in FIG. 1D and FIG. 1E, the isolation layer 501 covers at least a portion of the chip 200. The isolation layer 501 disposed between the chip 200 and the antenna 300. In a top view of the antenna device 15, a length $L_{501}$ of the isolation layer 501 along the short side direction D1 of the chip 200 is greater than a width $W_{200}$ of the chip 200, and the isolation layer 501 along a long side direction D2 of the chip 200 is not cover the first bonding line segment 310 and the second bonding line segment 320 of the antenna 300.

Figure 2A:
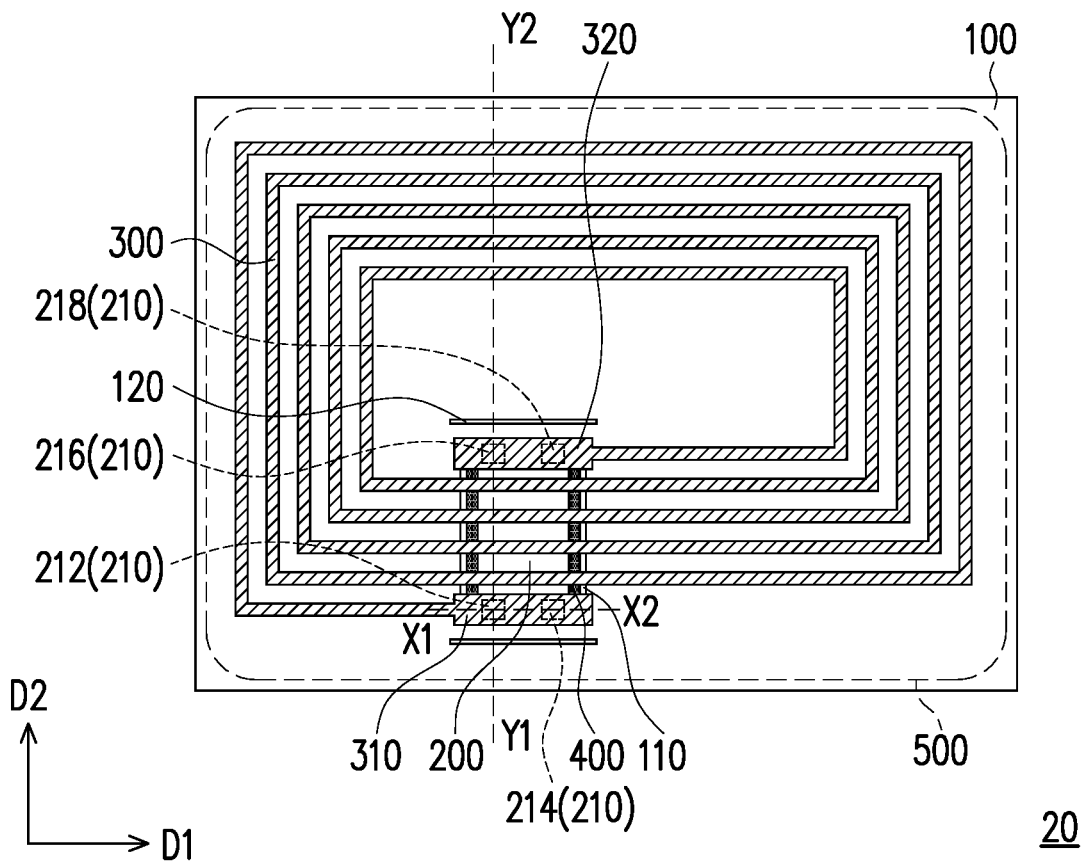
FIG. 2A is a top view of an antenna device according to the second embodiment of the invention.
Figure 2B:
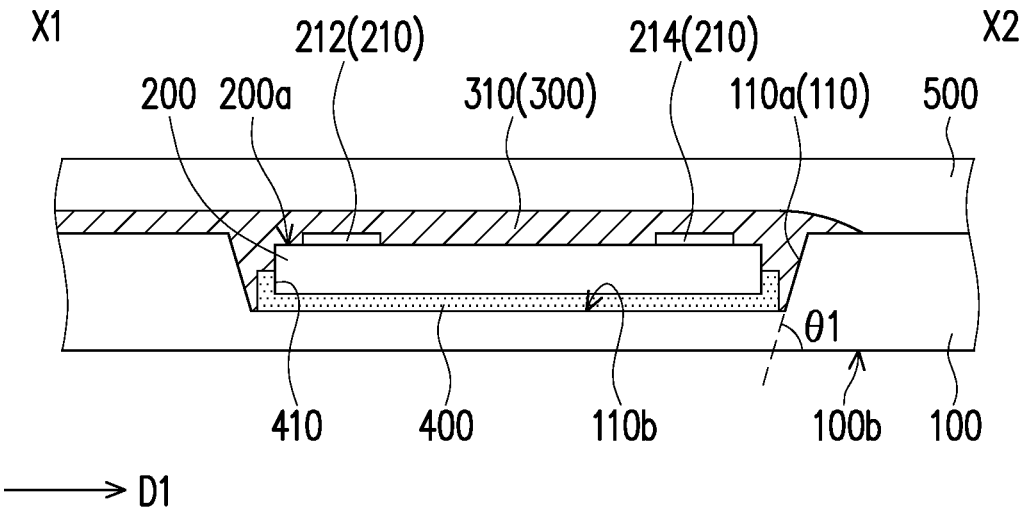
FIG. 2B is a partial cross-sectional view of line X1-X2 of FIG. 2A.
Figure 2C:
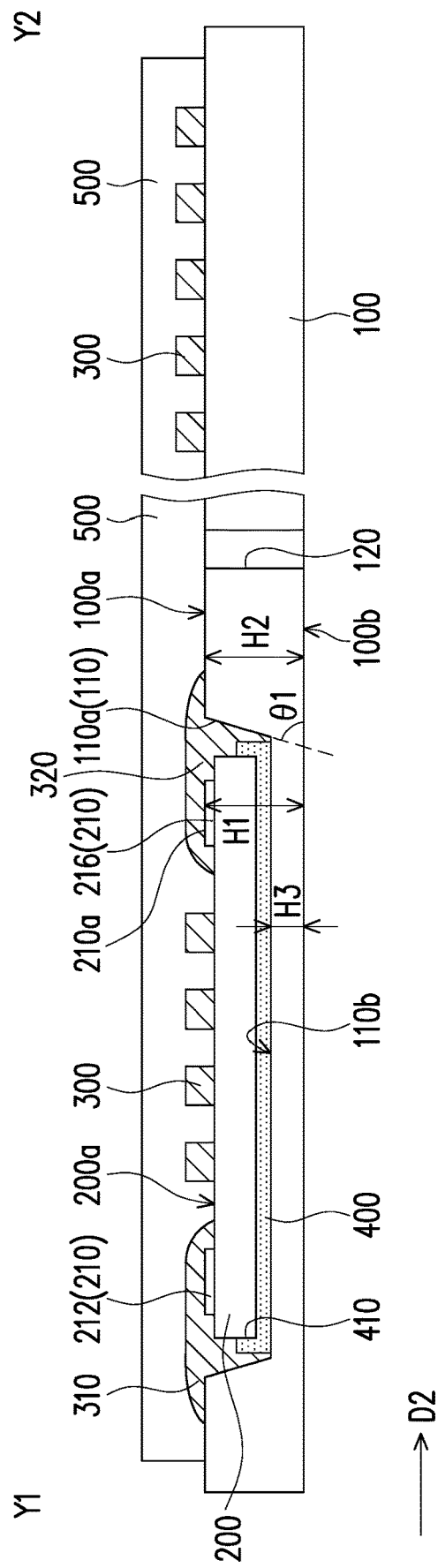
FIG. 2C is a cross-sectional view of line Y1-Y2 of FIG. 2A.

FIG. 2A is a top view of an antenna device according to the second embodiment of the invention; FIG. 2B is a partial cross-sectional view along line X1-X2 in FIG. 2A; FIG. 2C is a cross-sectional view along line Y1-Y2 of FIG. 2A. It should be mentioned here that, the embodiment of FIG. 2A to FIG. 2C adopts the reference numerals of the embodiment of FIG. 1A to FIG. 1C and a portion of the contents thereof, wherein the same or similar numerals are used to represent the same or similar elements, and descriptions of the same technical contents are omitted. The omitted portions are as described in the above embodiments and are not repeated herein.

Referring to FIG. 2A to FIG. 2C, the difference between an antenna device 20 of the present embodiment and the antenna device 10 of the first embodiment is: in the antenna device 20 of the present embodiment, the substrate 100 further has trenches 120 in the area around the chip, thereby reducing influence such as the chip being broken by external force during the manufacturing process of the antenna device 20. As shown in FIG. 2A, the trenches 120 are adjacent to the short side of the chip 200 and are separated from the chip 200 by a distance. In the present embodiment, the distance between the trenches 120 and the chip 200 is, for example, 2 mm, but the invention is not limited thereto. It should be noted that although the number of trenches shown in FIG. 2A is two as an example, the invention is not limited thereto. In other embodiments, the number of trenches may also be 1 or greater than or equal to 2. In the present embodiment, the length extending direction of the trenches 120 is, for example, parallel to the short side direction D1 of the chip 200, and the length of the trenches 120 is, for example, greater than or equal to the width of the chip 200. The depth of the trenches 120 is, for example, less than or equal to the thickness of the substrate 100. In the present embodiment, the trenches 120 penetrate the substrate 100, for example. Accordingly, during the manufacturing process, when the chip position is deviated due to the difference in ductility between the substrate and the chip, the trenches may function as a buffer to prevent the chip from being pulled and broken, thereby improving the yield of the antenna device.

Figure 3A:
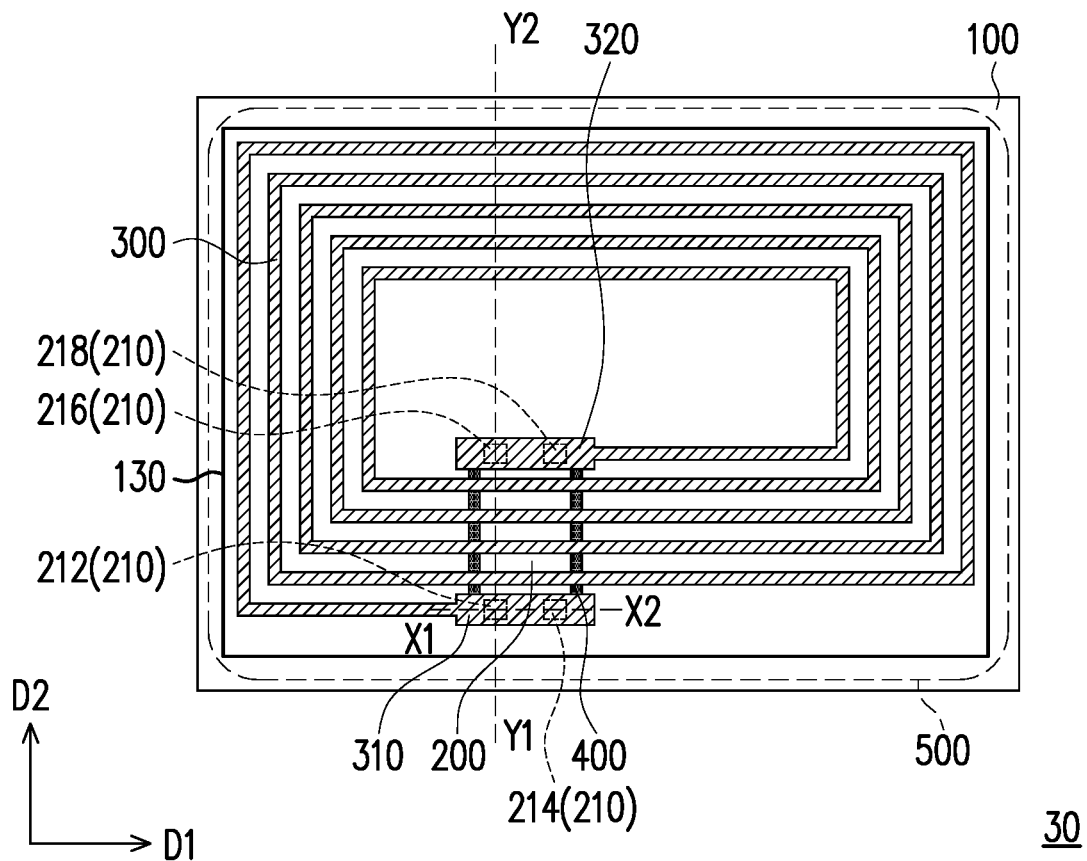
FIG. 3A is a top view of an antenna device according to the third embodiment of the invention.
Figure 3B:
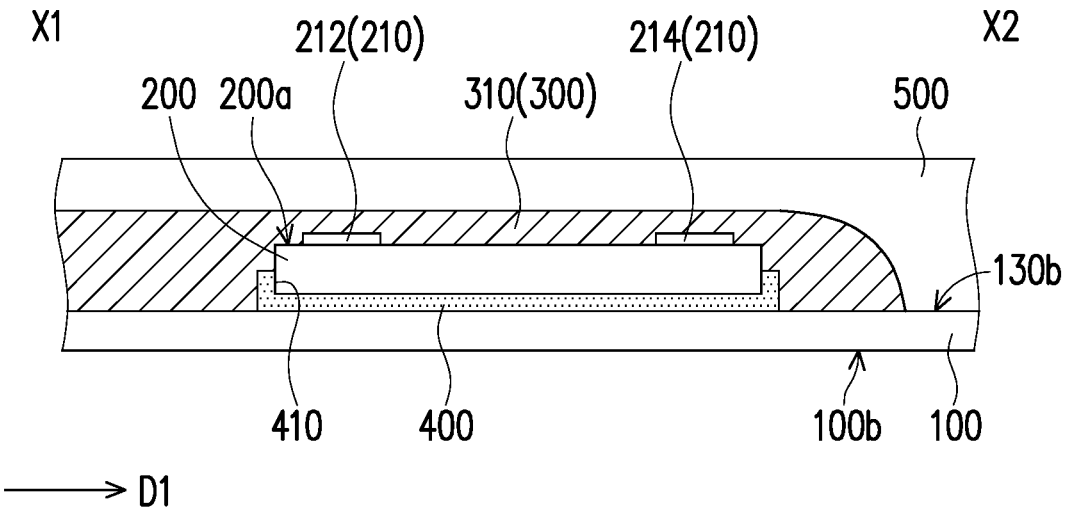
FIG. 3B is a partial cross-sectional view of line X1-X2 of FIG. 3A.
Figure 3C:
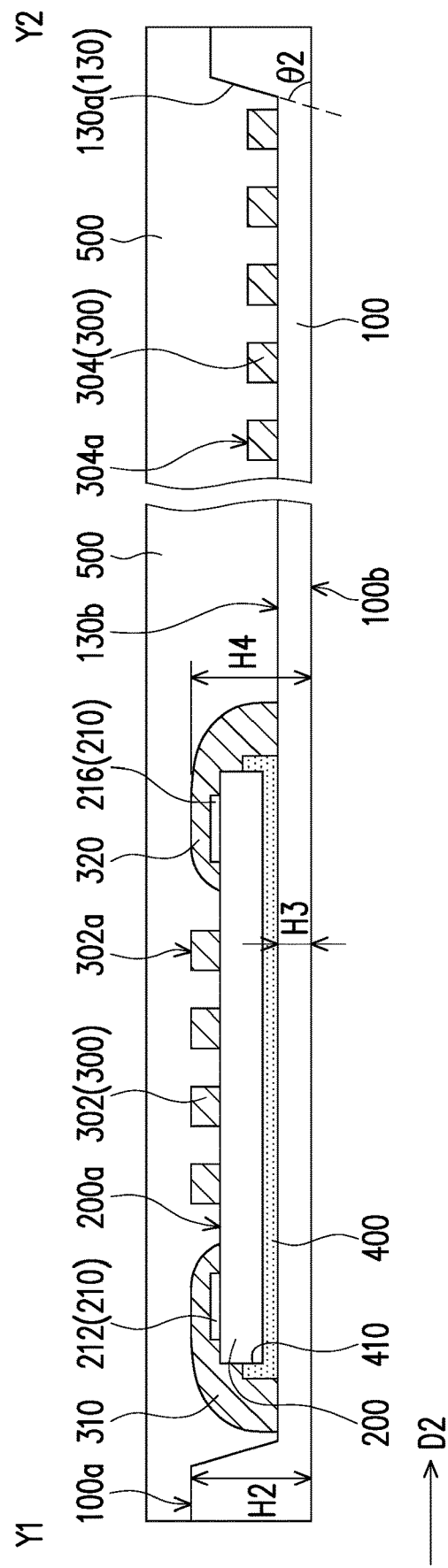
FIG. 3C is a cross-sectional view of line Y1-Y2 of FIG. 3A.

FIG. 3A is a top view of an antenna device according to the third embodiment of the invention; FIG. 3B is a partial cross-sectional view along line X1-X2 in FIG. 3A; FIG. 3C is a cross-sectional view along line Y1-Y2 of FIG. 3A. It should be mentioned here that, the embodiment of FIG. 3A to FIG. 3C adopts the reference numerals of the embodiment of FIG. 1A to FIG. 1C and a portion of the contents thereof, wherein the same or similar numerals are used to represent the same or similar elements and descriptions of the same technical contents are omitted. The omitted portions are as described in the above embodiments and are not repeated herein.

Referring to FIG. 3A to FIG. 3C, the difference between an antenna device 30 of the present embodiment and the antenna device 10 of the first embodiment is: the area of a groove 130 of the antenna device 30 of the present embodiment is larger than the area of the groove 110 of the antenna device 10 of the first embodiment. In the present embodiment, in addition to the chip 200, the antenna 300 is also completely accommodated in the groove 130. Referring to FIG. 3C, there is an included angle θ2 between a sidewall 130a of the groove 130 and the bottom surface 100b of the substrate 100, and the included angle θ2 may be an acute angle, but the invention is not limited thereto.

Referring to FIG. 3A, in the top view direction of the antenna device, the coverage area of the protective layer 500 is, for example, larger than the area of the groove 130. Therefore, the chip and the antenna may be protected from being damaged during the manufacturing process, and the antenna may also be prevented from falling off.

Referring to FIG. 3C, the antenna 300 substantially includes two types of traces on different planes, such as an antenna 302 located on the chip 200 and an antenna 304 located at a bottom portion 130b of the groove 130. In the present embodiment, a surface 302a of the antenna 302 is higher than a surface 304a of the antenna 304. In addition, the depth of the groove 130 may be set in such a way that the surface 302a of the antenna 302 is substantially aligned with the surface 100a of the substrate 100. Specifically, the distance between the surface 302a of the antenna 302 and the bottom surface 100b of the substrate 100 is set to H4, and the thickness of the substrate 100 located outside the groove 130 is set to H2, then the distance H4 may be less than the thickness H2, or, for example, the distance between the surface 302a of the antenna 302 and the surface 100a of the substrate 100 is set to |H4−H2|≤5 µm. In an embodiment, the distance |H4−H2| is set to be substantially 0 µm, for example, that is, the surface 302a of the antenna 302 and the surface 100a of the substrate 100 may be coplanar. In this way, not only may the overall thickness of the antenna device 30 be reduced, issues such as the chip or the antenna is protruded from the substrate and is readily damaged during the manufacturing process and therefore affecting the yield, or the antenna is readily disconnected may also be prevented.

Figure 4A:
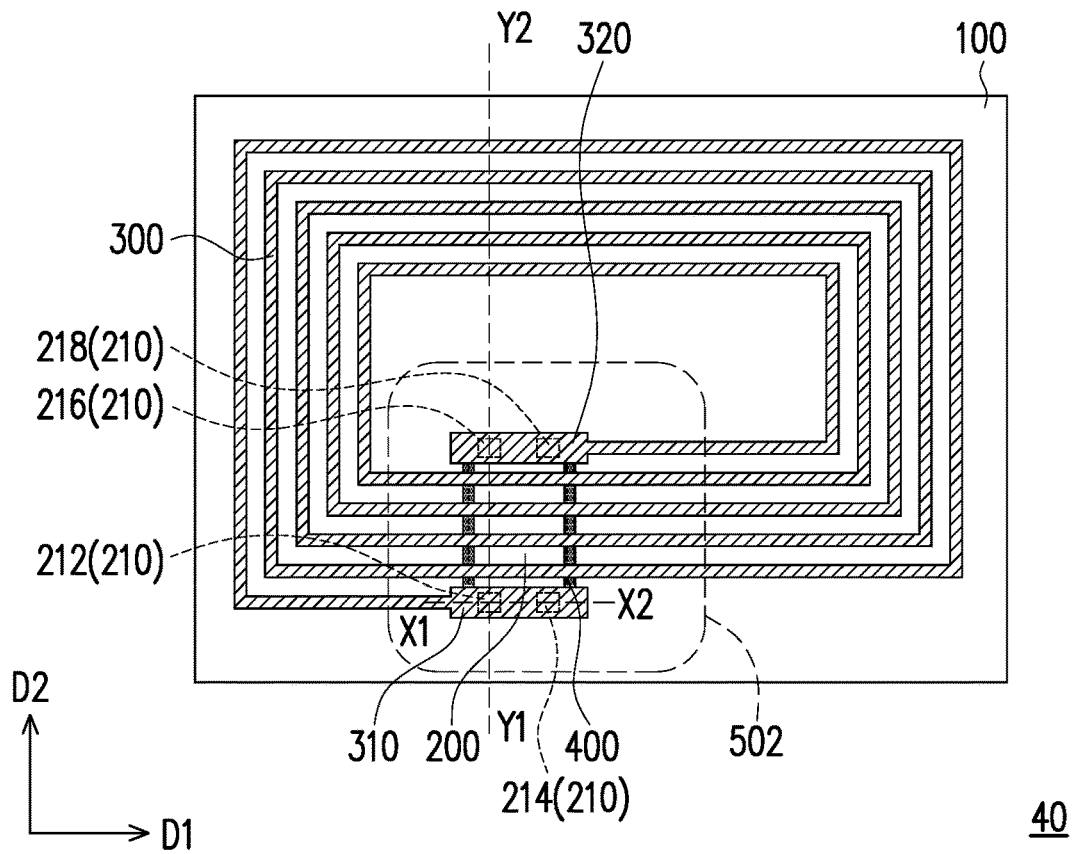
FIG. 4A is a top view of an antenna device according to the fourth embodiment of the invention.
Figure 4B:
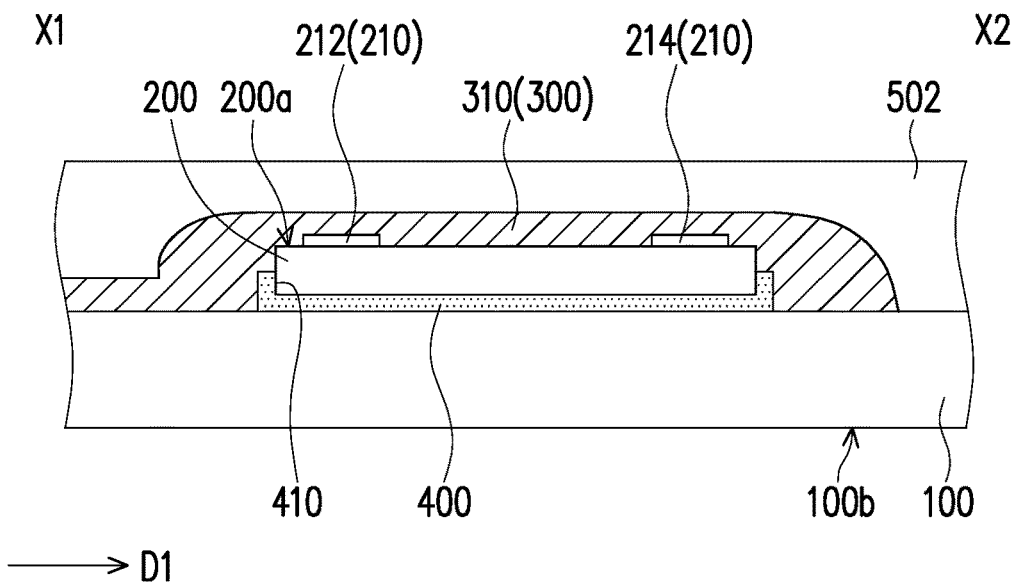
FIG. 4B is a partial cross-sectional view of line X1-X2 of FIG. 4A.
Figure 4C:
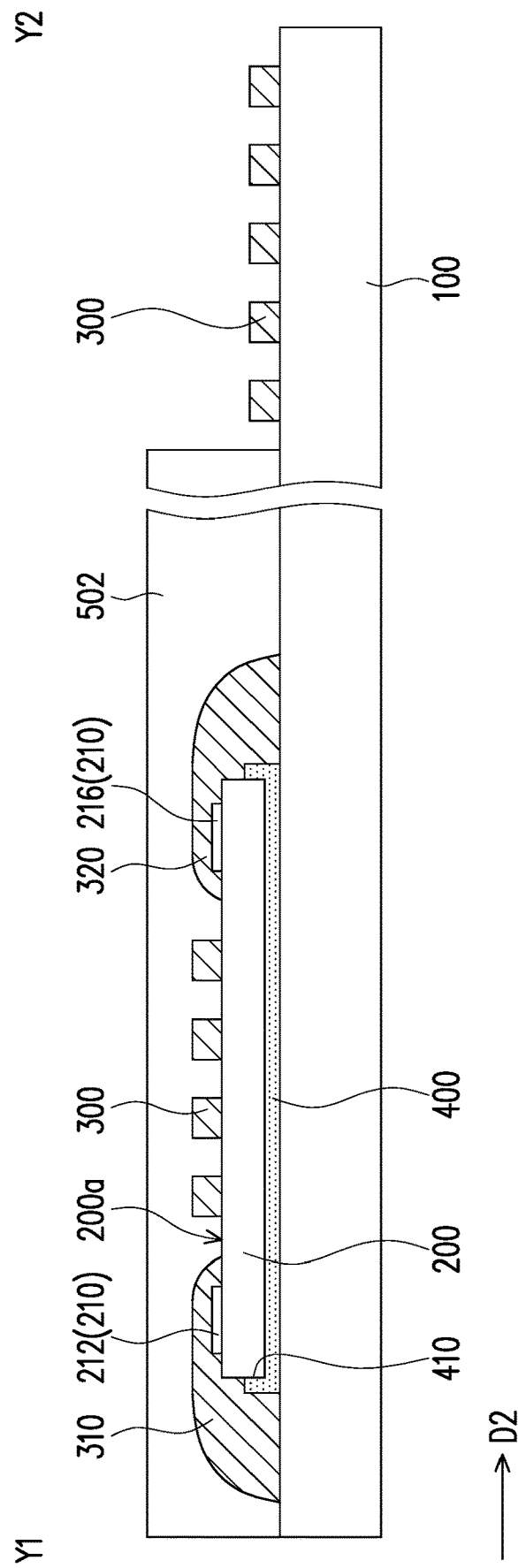
FIG. 4C is a cross-sectional view of line Y1-Y2 of FIG. 4A.

FIG. 4A is a top view of an antenna device according to the fourth embodiment of the invention; FIG. 4B is a partial cross-sectional view along line X1-X2 in FIG. 4A; FIG. 4C is a cross-sectional view along line Y1-Y2 of FIG. 4A. It should be mentioned here that, the embodiment of FIG. 4A to FIG. 4C adopts the reference numerals of the embodiment of FIG. 1A to FIG. 1C and a portion of the contents thereof, wherein the same or similar reference numerals are used to represent the same or similar elements and descriptions of the same technical contents are omitted. The omitted portions are as described in the above embodiments and are not repeated herein.

Referring to FIG. 4A to FIG. 4C, the difference between an antenna device 40 of the present embodiment and the antenna device 10 of the first embodiment is that the substrate 100 does not include the groove 110, and the area of a protective layer 502 is smaller. In the top view direction of the antenna device, the protective layer 502 only covers a portion of the antenna 300 near the junction with the chip 200. In other words, the coverage area of the protective layer 502 is at least larger than the area where the chip 200 is disposed. In this way, the chip may be protected from damage during the manufacturing process.

In the present embodiment, compared with a conventional antenna device, the antenna device 40 of the invention has a smaller overall thickness, and the step between the chip and the substrate during antenna printing is small. For example, compared to a conventional antenna device (thickness greater than 100 µm), the thickness of the antenna device 40 only includes the thickness of the substrate 100, the adhesive layer 400, the chip 200, and the antenna 300. Therefore, the overall thickness of the antenna device 40 may be thinned to 70 µm to 80 µm. In addition, when the adhesive layer 400 does not have the groove 410, the step between the chip and the substrate when the antenna 300 is printed is, for example, 23 µm, which is less than the thickness of a conventional antenna device, and technical effects such as preventing chip cracking and antenna disconnection may also be achieved. Moreover, when the adhesive layer 400 has the groove 410, the step between the chip and the substrate during the printing of the antenna 300 may be further reduced to 15 µm, so that the above technical effects are better.

Hereinafter, a manufacturing process of an antenna device according to the fifth embodiment of the invention is explained.

FIG. 5A to FIG. 5D are flowcharts of a manufacturing method of an antenna device according to the fifth embodiment of the invention. It should be mentioned here that, the embodiment of FIG. 5A to FIG. 5D adopts the reference numerals of the embodiment of FIG. 1A to FIG. 1C and a portion of the contents thereof, wherein the same or similar reference numerals are used to represent the same or similar elements and descriptions of the same technical contents are omitted. The omitted portions are as described in the above embodiments and are not repeated herein. In the present embodiment, the area of the adhesive layer 400 in the projection direction of the substrate is larger than the area of the chip 200 in the projection direction of the substrate as an example.

Figure 5A:
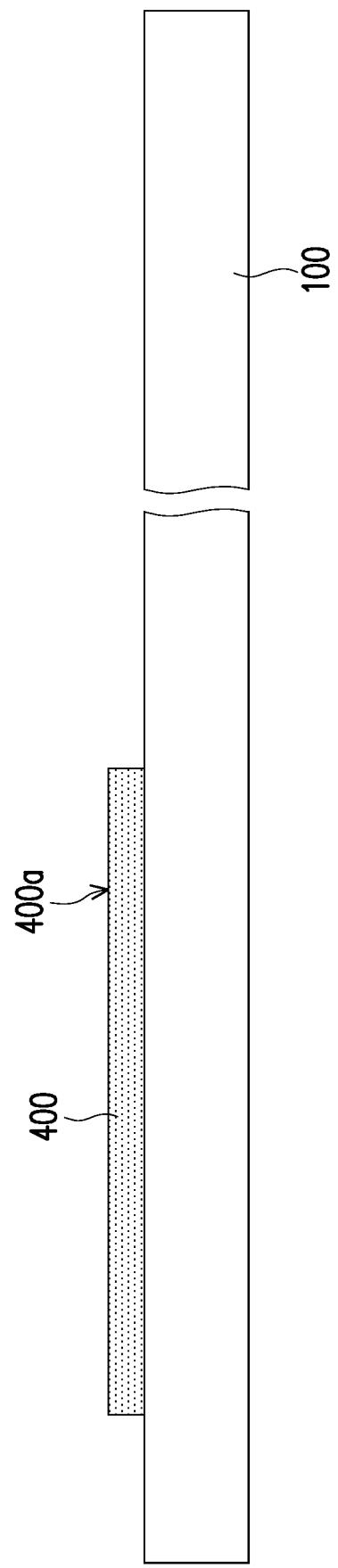
FIG. 5A to FIG. 5D are flowcharts of a manufacturing method of an antenna device according to the fifth embodiment of the invention.

Referring to FIG. 5A, the substrate 100 is provided. Next, corresponding to the predetermined forming area of the chip in the subsequent steps, the adhesive layer 400 is formed on the substrate.

Figure 5B:
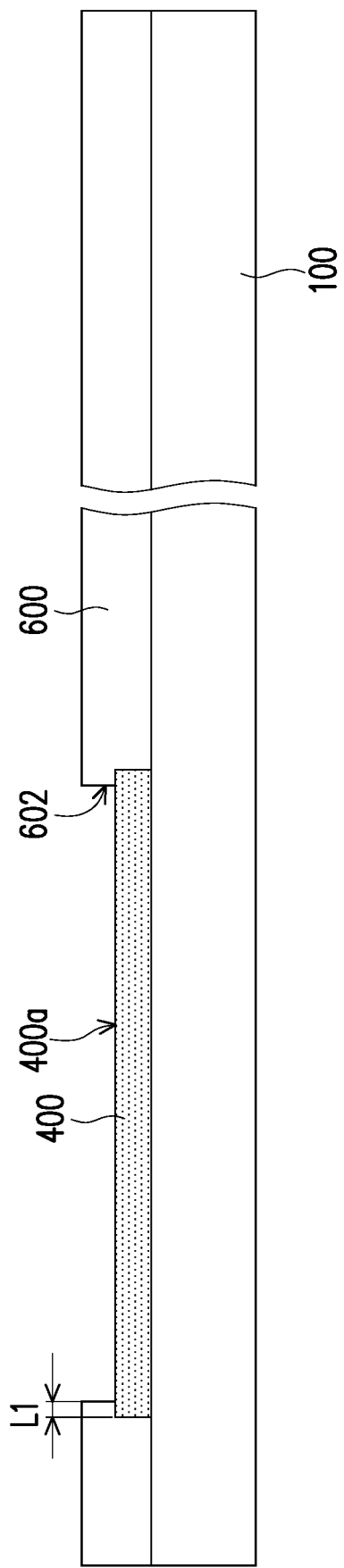

Referring to FIG. 5B, a printed layer 600 is formed on the substrate 100. In the present embodiment, the printed layer 600 further has an opening 602 to expose a portion of the adhesive layer 400. In other words, the printed layer 600 covers a portion of the adhesive layer 400, and there is a distance L1 between the sidewall of the opening 602 and the side surface of the adhesive layer 400. In the present embodiment, the adhesive layer 400 and the opening 602 of the printed layer 600 together form a groove shape, that is, a surface 400a of the adhesive layer 400 exposed by the opening 602 is, for example, the bottom portion of the groove, and the sidewall of the opening 602 is, for example, the sidewall of the groove. In the present embodiment, the material of the printed layer 600 is, for example, printing ink used for printing trademarks, packaging designs, and the like. The thickness of the printed layer 600 is, for example, 15 μm.

Figure 5C:
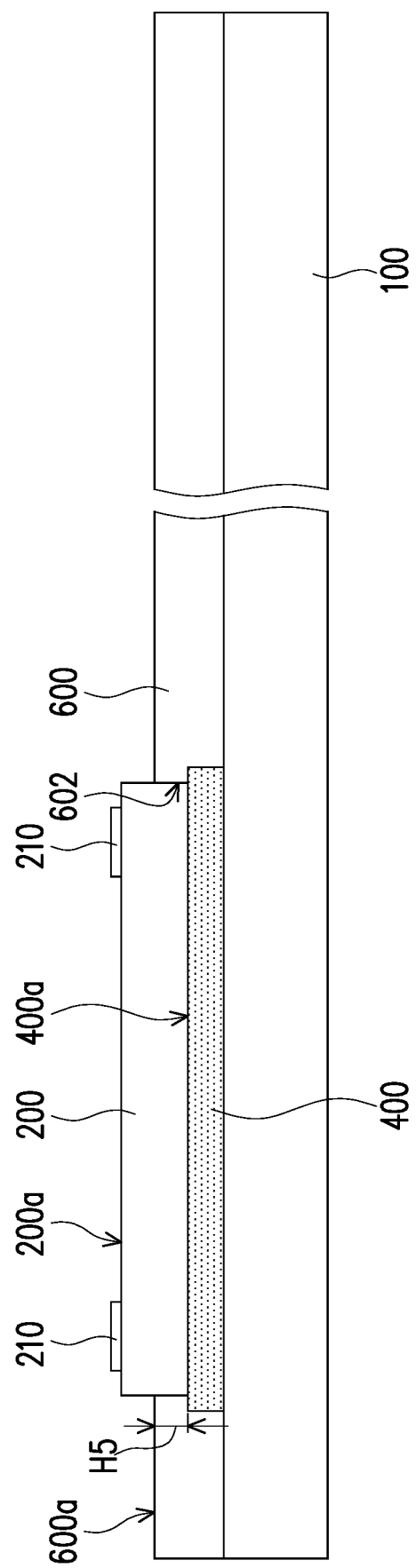

Referring to FIG. 5C, the chip 200 is placed on the adhesive layer 400, that is, the chip 200 is disposed in the opening 602 of the printed layer 600. In the present embodiment, the depth of the groove formed by the printed layer 600 and the adhesive layer 400 is, for example, ½ of the thickness of the chip 200. Specifically, referring to FIG. 5C, there is a distance H5 between a surface 600a of the printed layer 600 and the surface 400a of the adhesive layer 400, and the distance H5 is, for example, less than or equal to ½ the thickness of the chip 200.

Then, after the chip 200 is fixed by, for example, a heating and pressing process, the surface 600a of the printed layer 600 and the active surface 200a of the chip 200 are made coplanar.

Figure 5D:
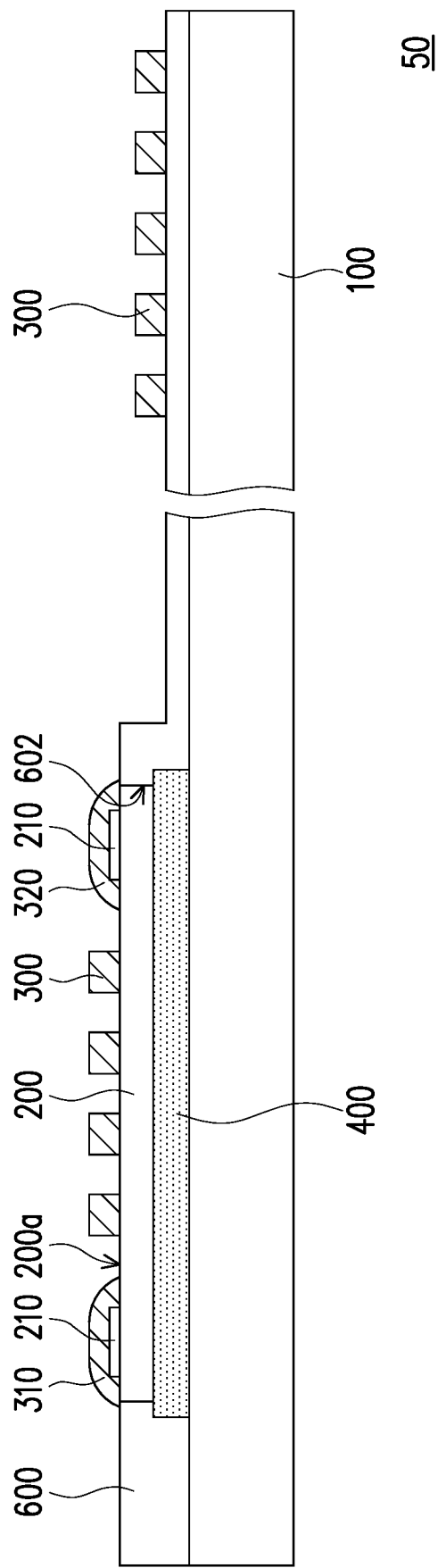

Referring to FIG. 5D, the antenna 300 is formed on the substrate 100. In the present embodiment, the antenna 300 is formed on the printed layer 600 and the chip 200, for example. So far, the manufacture of an antenna device 50 of the present embodiment is substantially completed. In the present embodiment, in the top view direction of the antenna device, the area of the printed layer 600 is, for example, between the area of the chip 200 and the area of the antenna 300, and the printed layer 600 is overlapped with a portion of the adhesive layer 400, but is not overlapped with the position of the chip 200.

Based on the above, by providing the above printed layer on the substrate, not only may the overall thickness of the antenna device 50 be reduced, the chip may also be protected from being damaged during the manufacturing process and affecting the yield, or the bonding between the antenna and the chip may be less affected by the topography of the bonding surface, to avoid situations such as disconnection of the antenna.

Hereinafter, implementations that may be applied to the pads in the above embodiments and circuit structures that may be applied to chips are exemplified, but the invention is not limited to the following implementations.

Figure 6A:
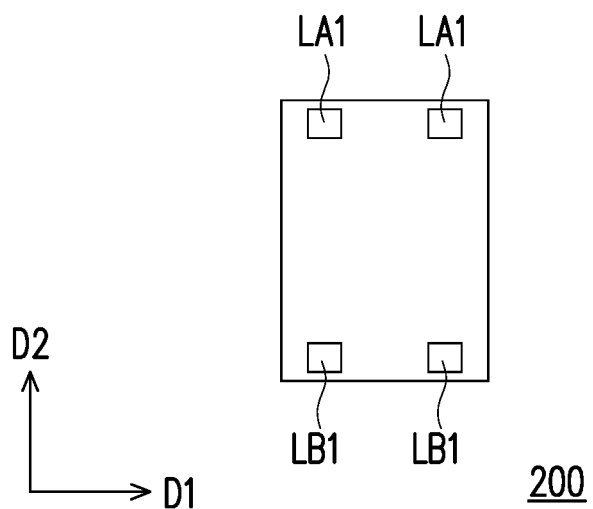
FIG. 6A is a top view of a chip according to the sixth embodiment of the invention.
Figure 6B:
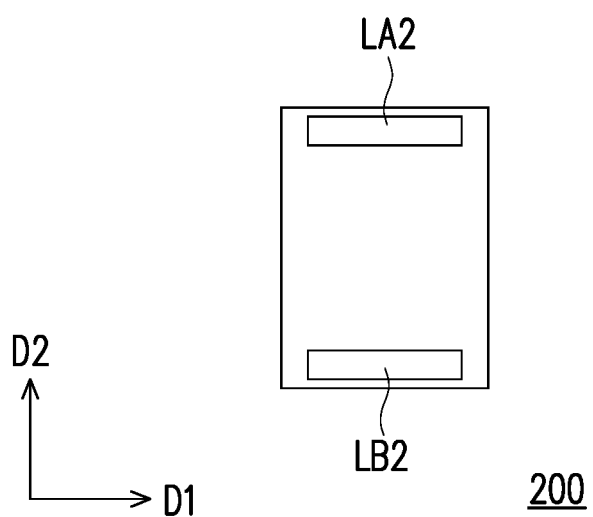
FIG. 6B is a top view of a chip according to the seventh embodiment of the invention.
Figure 7:
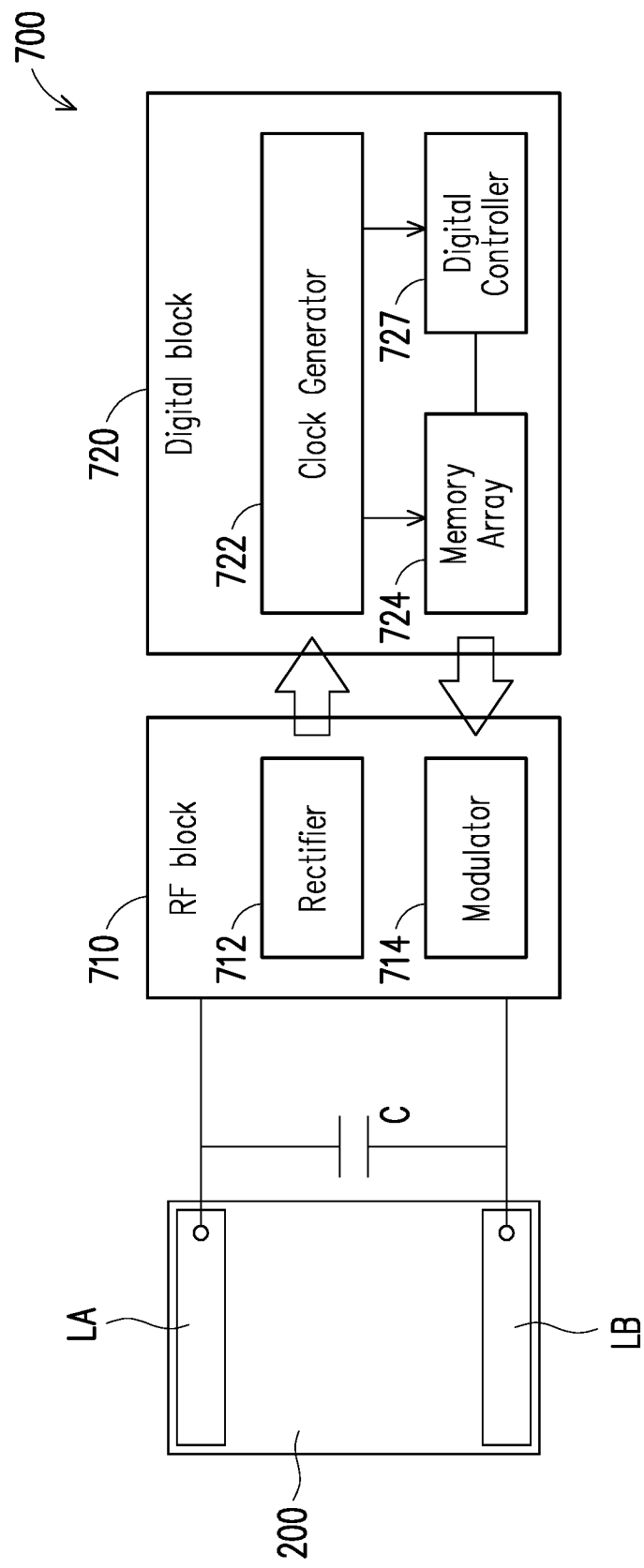
FIG. 7 is a circuit structure diagram of a chip according to the eighth embodiment of the invention.

FIG. 6A is a top view of a chip according to the sixth embodiment of the invention; FIG. 6B is a top view of a chip according to the seventh embodiment of the invention; FIG. 7 is a circuit structure diagram of a chip according to the eighth embodiment of the invention. It should be mentioned here that, the embodiments of FIG. 6A, FIG. 6B, and FIG. 7 adopt the reference numerals of the embodiment of FIG. 1A to FIG. 1C and a portion of the contents thereof, wherein the same or similar reference numerals are used to represent the same or similar elements and descriptions of the same technical contents are omitted. The omitted portions are as described in the above embodiments and are not repeated herein.

Referring to FIG. 6A, the pads of the chip 200 include, for example, a plurality of pads LA1 and a plurality of pads LB1, wherein in the long side direction D2 of the chip 200, the plurality of pads LA1 are located on a short side of the chip 200, and the plurality of pads LB1 are located on another short side of the chip 200. It should be noted that although the number of the pads LA1 and the pads LB1 shown in FIG. 6A is two as an example, the invention is not limited thereto. In other embodiments, the number of the pads LA1 and the pads LB1 may also be greater than or equal to 2. For example, in the chip 200 in any of the above embodiments, the third pad 216 and the fourth pad 218 may be regarded as the plurality of pads LA1, and the first pad 212 and the second pad 214 may be regarded as the plurality of pads LB1; or the first pad 212 and the second pad 214 may be regarded as the plurality of pads LA1, and the third pad 216 and the fourth pad 218 may be regarded as the plurality of pads LB1. Therefore, the structure of the pads LA1 and the pads LB1 is similar to the pads 210 in any of the above embodiments, and is not repeated herein. In addition, two ends of the antenna (such as the first bonding line segment 310 and the second bonding line segment 320 of the antenna 300) respectively cover the plurality of pads LA1 and the plurality of pads LB1, and are electrically connected to the driving circuit in the chip 200 via the pads LA1 and the pads LB1. Accordingly, one of the pads LA1 and the pads LB1 may be used as an input terminal, and the other may be used as an output terminal to function.

Referring to FIG. 6B, the pads of the chip 200 include, for example, a pad LA2 and a pad LB2, wherein on the long side direction D2 of the chip 200, the pad LA2 is located on a short side of the chip 200, and the pad LB2 is located on another short side of the chip 200. The pad LA2 and the pad LB2 are, for example, elongated pads extended along the short side direction D1 of the chip 200. For example, the pad LA2 and the pad LB2 may be elongated pads with a length slightly smaller than the width of the chip 200. In this way, the contact area between the pads of the chip and the antenna may be increased. In addition, two ends of the antenna (such as the first bonding line segment 310 and the second bonding line segment 320 of the antenna 300) respectively cover the pad LA2 and the pad LB2, and are electrically connected to the driving circuit in the chip 200 via the pad LA2 and the pad LB2. Accordingly, one of the pad LA2 and the pad LB2 may be used as an input terminal, and the other may be used as an output terminal to function.

Referring to FIG. 7, the pad LA on the chip 200 is, for example, the plurality of pads LA1 or pads LA2, and the pad LB is, for example, the plurality of pads LB1 or pads LB2, but the invention is not limited thereto. One of the pad LA and the pad LB may be used as an input terminal, and the other may be used as an output terminal, for example. In the present embodiment, a circuit structure 700 is coupled to the chip 200 via the pad LA and the pad LB, and is connected in parallel with a capacitor C. The capacitor C is, for example, a tuning capacitor. In an embodiment, the circuit structure 700 may include a radio frequency block 710 and a digital block 720. The radio frequency block 710 includes, for example, a rectifier 712 and a modulator 714, etc., and the digital block 720 includes, for example, a clock generator 722, a memory array 724, and a digital controller 727, etc., but the invention is not limited thereto. In the present embodiment, for example, the pad LA is used as the input terminal to receive an input signal from the circuit structure 700 and the pad LB is used as the output terminal to output a signal to the circuit structure 700. After a signal is received via the antenna, the signal may be outputted to the circuit structure 700 via the pad LB. In addition, the circuit structure 700 performs rectification, modulation, writing, or reading and the like on the signal via the radio frequency block 710 and the digital block 720. After the signal is processed, the circuit structure 700 may output the processed signal to the pad LA.

Hereinafter, a manufacturing process of an antenna device according to an embodiment of the invention is described. The following content is described in a roll-to-roll process, but the invention is not limited thereto.

Figure 8A:
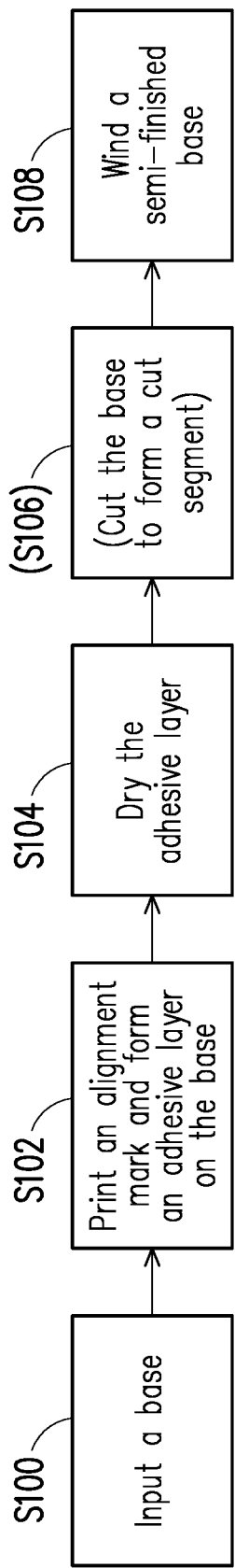
FIG. 8A, FIG. 9A, and FIG. 10A are flowcharts of a manufacturing method of an antenna device according to the ninth embodiment of the invention.
Figure 8B:
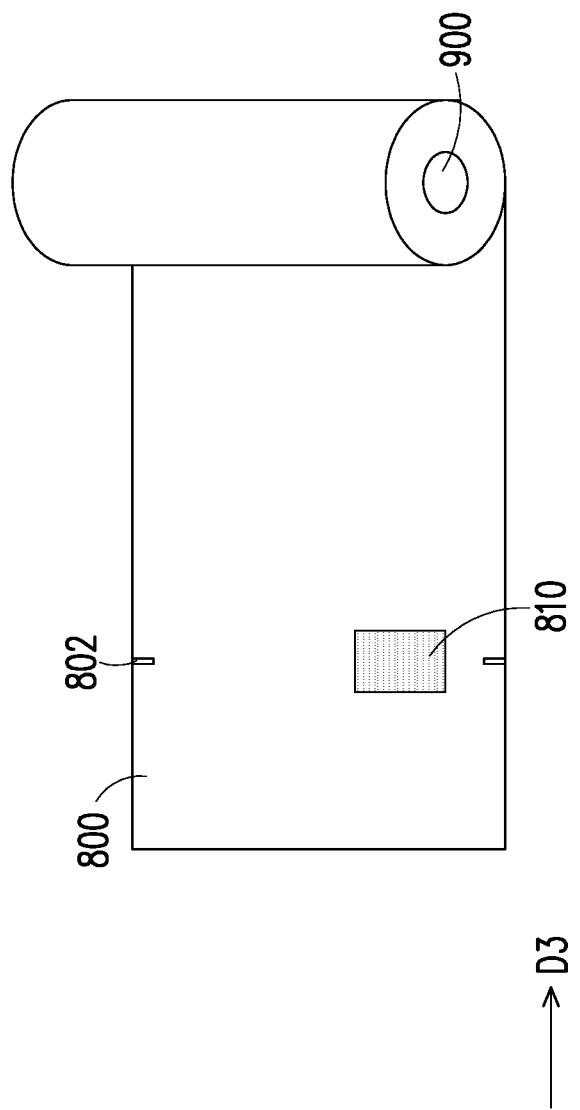
FIG. 8B, FIG. 9B, and FIG. 10B are partial three-dimensional diagrams of a manufacturing method of an antenna device according to the ninth embodiment of the invention.

FIG. 8A is a flowchart of a manufacturing method of an antenna device according to the ninth embodiment of the invention; FIG. 8B is a partial three-dimensional diagram of the manufacturing method of FIG. 8A.

Referring to FIG. 8A and FIG. 8B, the substrate preparation steps include step S100, step S102, step S104, step S108, and the like.

In step S100, a substrate (raw material base) is inputted into a printing equipment via a feed roller. In the present embodiment, the substrate is moved in a roll-to-roll manner, but the invention is not limited thereto. The substrate is, for example, paper, polyethylene terephthalate, polyvinyl chloride, plastic film, or other suitable materials, and the invention is not limited thereto. For example, when the antenna device is to be used on a packaging box (such as milk cartons, paper bags, biscuit bags, etc.), the substrate may adopt the same material as the base used to form the packaging box (such as paper, kraft paper, plastic, etc.)

In step S102, an alignment mark 802 is printed on the substrate and an adhesive layer 810 is formed corresponding to a predetermined forming area of a chip in a subsequent step. In the present embodiment, the adhesive layer 810 is, for example, hot melt adhesive or other suitable adhesive materials. In some embodiments, the adhesive layer 810 may further have a groove (for example, the groove 410 of FIG. 1B).

In an embodiment, a groove may be further formed in the substrate. For example, the groove 110 of FIG. 1A or the groove 130 of FIG. 3A may be formed. In addition, the adhesive layer 810 may be formed in the groove. The method of forming the groove is, for example, thinning the substrate thickness of the predetermined forming area of the chip or the antenna by pressing, stamping, etc., and forming a groove capable of accommodating at least one of the chip and the antenna at the predetermined forming area, but the invention is not limited thereto.

Next, in step S104, the adhesive layer 810 is dried to cure the adhesive layer 810. In the present embodiment, the method of drying the adhesive layer 810 is not particularly limited, as long as the adhesive layer 810 does not fall off due to subsequent processes.

Then, in step S108, the substrate 800 (semi-finished base) having the alignment mark 802 and the adhesive layer 810 is collected by a receiving roller 900, and the subsequent steps are performed in a bonding equipment.

In some embodiments, step S106 may be optionally performed between step S104 and step S108. In step S106, for example, a trench (not shown) is formed by cutting the substrate. In the present embodiment, corresponding to the predetermined forming area of the chip in the subsequent steps, the length of the trench is, for example, greater than or equal to the width of the predetermined forming area of the chip, and the depth of the trench is, for example, less than or equal to the thickness of the substrate. On the short side adjacent to the predetermined forming area of the chip, the trench is separated from the predetermined forming area of the chip by a distance. For example, the distance between the trench and the predetermined forming area of the chip is about 2 mm. The length extending direction of the trench is, for example, parallel to the rolling direction of the receiving roller 900, that is, the length extending direction of the trench is, for example, parallel to a moving direction D3 of the substrate. Accordingly, during subsequent manufacturing processes, when the chip position is deviated due to the difference in ductility between the substrate and the chip, the groove may function as a buffer to prevent the chip from being pulled and broken, thereby improving the yield of the antenna device.

In some embodiments, a printed layer having an opening may also be formed on the substrate via the manufacturing process shown in FIG. 5A to FIG. 5D between step S104 and step S108, and the opening exposes a portion of the adhesive layer 810, for example.

Figure 9A:
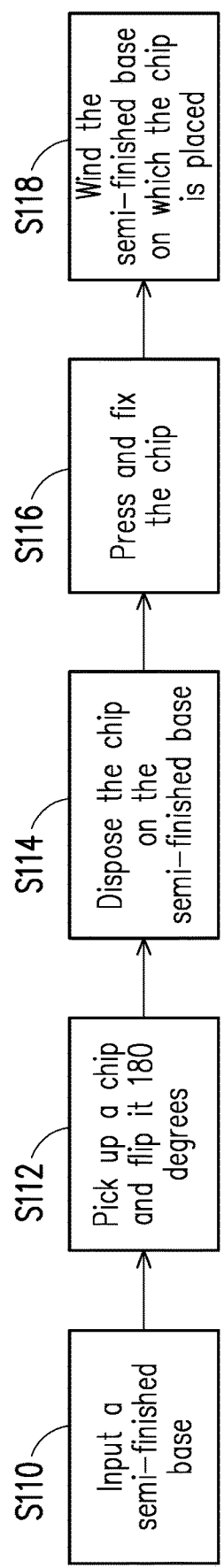
Figure 9B:
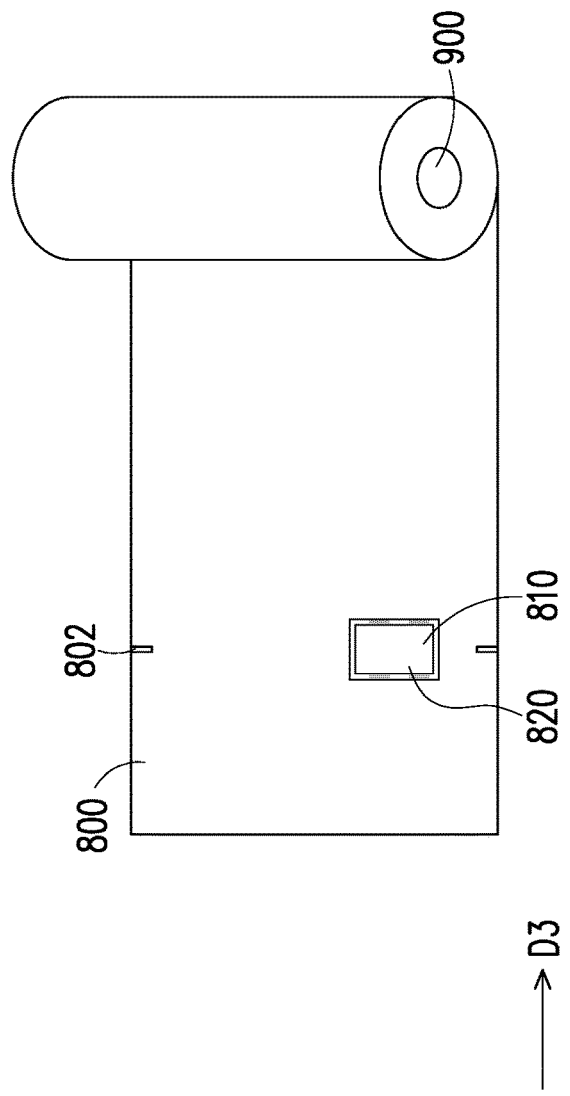

FIG. 9A and FIG. 9B are diagrams of the next step of FIG. 8A and FIG. 8B.

Referring to FIG. 9A and FIG. 9B, the chip placing step includes step S110, step S112, step S114, step S116, step S118, and the like.

In step S110, the substrate 800 to be collected in step S108 is inputted into a bonding equipment. In an embodiment, the bonding equipment is, for example, a flip-chip bonding machine.

In step S112, a chip 820 on, for example, a wafer or a sheet is picked up, and the pads (not shown) of the chip 820 are made to face upward (i.e., the back surface of the chip 820 faces the substrate 800). In some embodiments, for example, when the pads of the chip 820 located on a wafer or a sheet face the surface of the wafer, after the chip 820 is picked up, the chip 820 is turned 180 degrees so that the pads of the chip 820 face upward. The chip 820 may include two or more pads, wherein the pads are disposed on the active surface of the chip 820. For example, the pads may be the pads LA1 and the pads LB1 as shown in FIG. 6A, or the pads LA2 and the pads LB2 as shown in FIG. 6B, etc. The layout of the pads may be adjusted according to design requirements, and the invention is not limited thereto. In the present embodiment, the chip 820 may be a plastic-based integrated circuit element, that is, a chip type in which active elements and circuits are formed on a flexible substrate such as plastic. The active surface of the chip 820 is the surface where an integrated circuit including the thin-film transistor TFT, etc. is formed, and the pads may be used as contacts electrically connected to an internal integrated circuit in the chip 820. The material of the pads includes a conductive material, such as gold, silver, copper, aluminum, molybdenum, titanium, or other metals or alloys containing the above metals.

In step S114, the chip 820 is placed on the substrate 800. In the present embodiment, the chip 820 is placed on the adhesive layer 810 in a manner that there is an included angle between the short side direction of the chip 820 and the moving direction D3 of the substrate. The included angle between the short side direction of the chip 820 and the moving direction D3 of the substrate is, for example, less than or equal to 45 degrees, preferably 0 degrees. In other words, the short side direction of the chip 820 and the moving direction D3 of the substrate are preferably parallel to each other. The larger the contact area of the receiving roller and the chip, the easier it is to cause the bending angle of the chip to be too large when the chip is subsequently collected, so that issues such as the friction between the receiving roller and the surface of the chip is too large or the chip is more affected by the impact of the receiving roller occur, thereby causing damage to the chip. However, by placing the chip 820 having an included angle between the short side direction of the chip 820 and the moving direction D3 of the substrate, the force path of the chip in the moving direction D3 of the substrate is shorter and the bending angle of the chip is smaller. As a result, the chance of chip damage may be significantly reduced, thereby improving yield. In contrast, if the short side direction of the chip 820 and the moving direction D3 of the substrate are perpendicular to each other, the measured yield is extremely low, for example, less than 10%.

In some embodiments, when the substrate 800 further has a groove, the chip 820 is placed in the groove, for example. Accordingly, not only may the overall thickness of the antenna device formed later be reduced, but also issues such as the chip is protruded from the substrate and is readily damaged in a subsequent manufacturing process and thus affecting the yield may also be avoided.

Next, in step S116, the chip 820 is pressed and fixed. In the present embodiment, the method of pressing and fixing is, for example, hot pressing and fixing, wherein the adhesive layer 810 is heated to melt so as to fix the chip 820 on the substrate 800 via the adhesive layer 810.

Then, in step S118, the substrate 800 on which the chip 820 is placed is collected by the receiving roller 900, and subsequent steps are performed in a printing equipment.

Figure 10A:
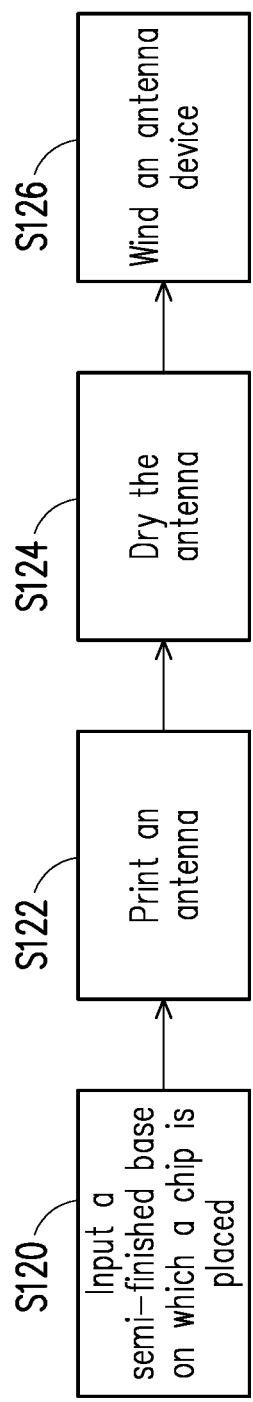
Figure 10B:
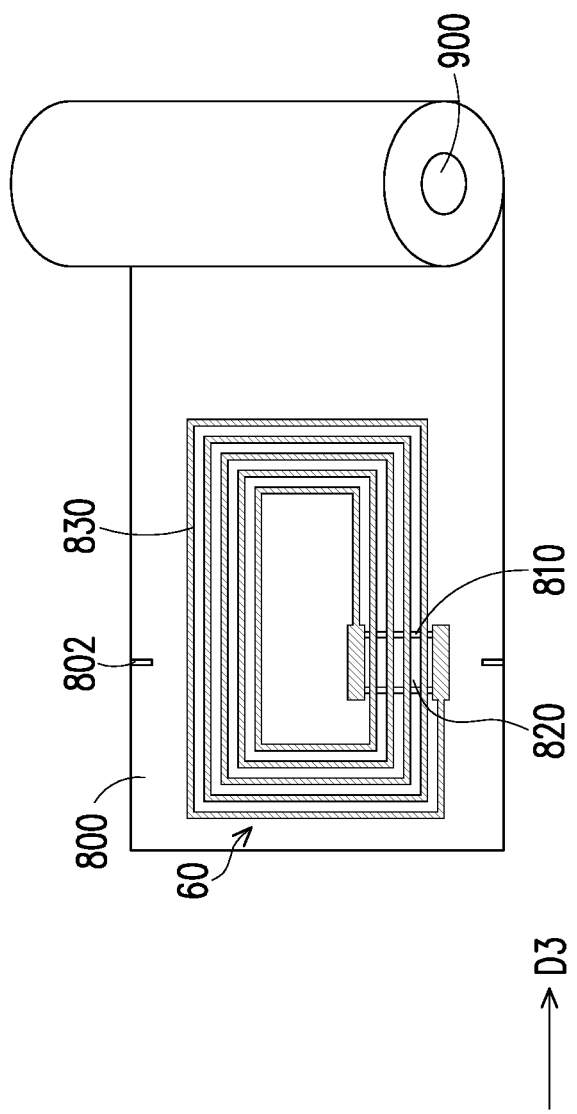

FIG. 10A and FIG. 10B are diagrams of the next step of FIG. 9A and FIG. 9B.

Referring to FIG. 10A and FIG. 10B, the antenna forming step includes step S120, step S122, step S124, step S126, and the like.

In step S120, the substrate 800 to be collected in step S118, that is, the substrate 800 on which the chip 820 is placed, is inputted into a printing equipment.

In step S122, an antenna 830 is printed. In the present embodiment, the antenna 830 is formed on the substrate 800 and the chip 820, and the antenna 830 is, for example, a spiral coil or other shapes. Two ends of the antenna 830 are electrically connected to the pads of the chip 820 respectively. In an embodiment, the antenna 830 may include the first bonding line segment 310 and the second bonding line segment 320 like the antenna 300 of FIG. 1A. For related description, please refer to the above embodiments, which is not repeated herein. In the present embodiment, the material of the antenna 830 is, for example, conductive silver nano ink, graphene ink, or other conductive materials. The method of printing the antenna 830 includes, for example, letterpress printing, gravure printing, screen printing, lithography, or thermal transfer, etc., but the invention is not limited thereto.

Next, in step S124, the antenna 830 is dried, and the antenna 830 is cured. In the present embodiment, the method of drying the antenna 830 includes, for example, thermal curing, light curing, or air-dry curing, etc., but the invention is not limited thereto. In an embodiment, after the antenna 830 is cured, a protective layer may be formed thereon, for example, the protective layer 500 of FIG. 1A or the protective layer 502 of FIG. 4A may be formed. So far, the manufacture of an antenna device 60 of the present embodiment is substantially completed. Lastly, in step S126, the antenna device 60 is collected.

In the present embodiment, the thicknesses of the substrate 800, the chip 820, and the antenna 830 in the antenna device 60 are, for example, 35 µm, 13 µm, and 10 µm, respectively. In some embodiments, when the chip 820 is placed in the groove, the overall thickness of the antenna device 60 may be less than 50 µm. Accordingly, compared with a conventional antenna device (thickness greater than 100 µm), not only is the overall thickness of the antenna device greatly reduced, issues such as the chip is protruded from the substrate and is readily damaged in a subsequent manufacturing process and thus affecting the yield may also be avoided. In addition, compared with a conventional manufacturing method of an antenna device, the steps of manufacturing the antenna device 60 are fewer, so that process efficiency may be improved.

Figure 10C:
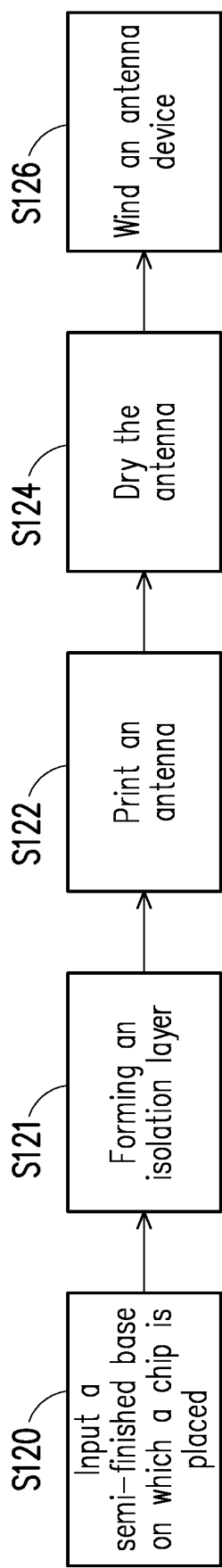
FIG. 10C and FIG. 10D are flowcharts of a manufacturing method of an antenna device according to another embodiment of the ninth embodiment of the invention.
Figure 10D:
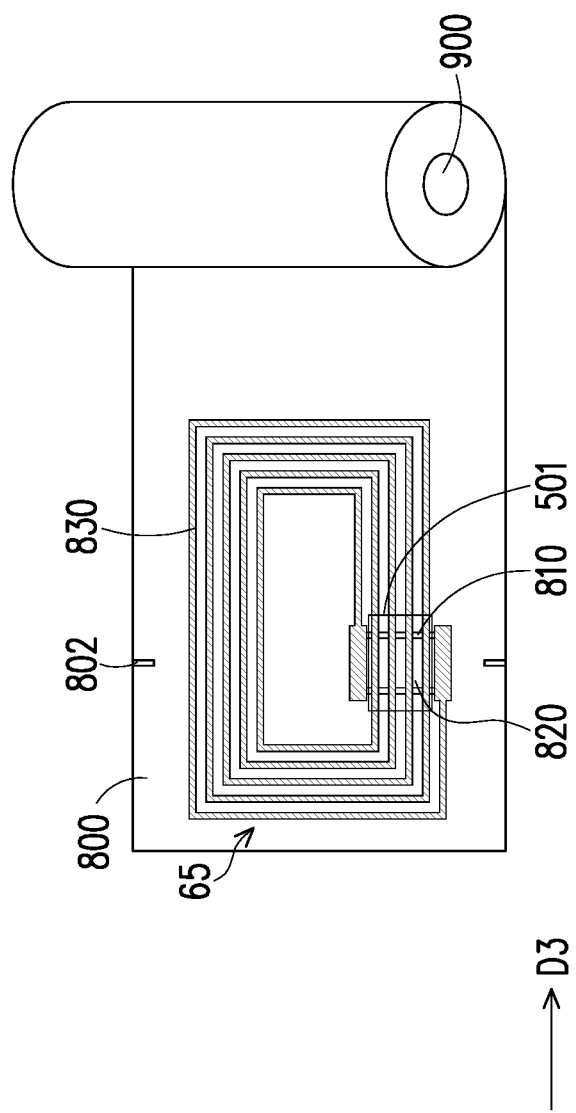

FIG. 10C and FIG. 10D are alternative diagrams of FIG. 10A and FIG. 10B, which are diagrams of the next step of FIG. 9A and FIG. 9B. Referring to FIG. 10C and FIG. 10D, compared to FIG. 10A and FIG. 10B, the antenna forming step further includes step S121 between step S120 and step S122.

More specifically, as shown in FIG. 10C, step S121 may be optionally performed before the before the antenna forming step S122. In step S121, an isolation layer 501 is formed on the chip 820, and then performed the above step S122 to print the antenna 830 onto the isolation layer 501 and the chip 820. Thus, as shown in FIG. 10D, an antenna device 65 having the similar configuration of the antenna device 15 of FIG. 1D is formed. In the present embodiment, the antenna device 65 includes the substrate 800, the chip 820, isolation layer 501 and the antenna 830. The thicknesses of the substrate 800, the chip 820, isolation layer 501 and the antenna 830 in the antenna device 65 are, for example, 120 µm, 13 µm, 30 µm, and 10 µm, respectively. For related description, please refer to the above embodiments, which is not repeated herein. Furthermore, in the present embodiment, the material of the isolation layer 501 is, for example, an ink like isolation glue, or other insulation materials. The method of forming the isolation layer 501 includes forming the ink on the chip by printing, gravure printing, or screen printing, etc., and then curing the ink through light or heating, or natural curing. The invention is not limited thereto.

Figure 11:
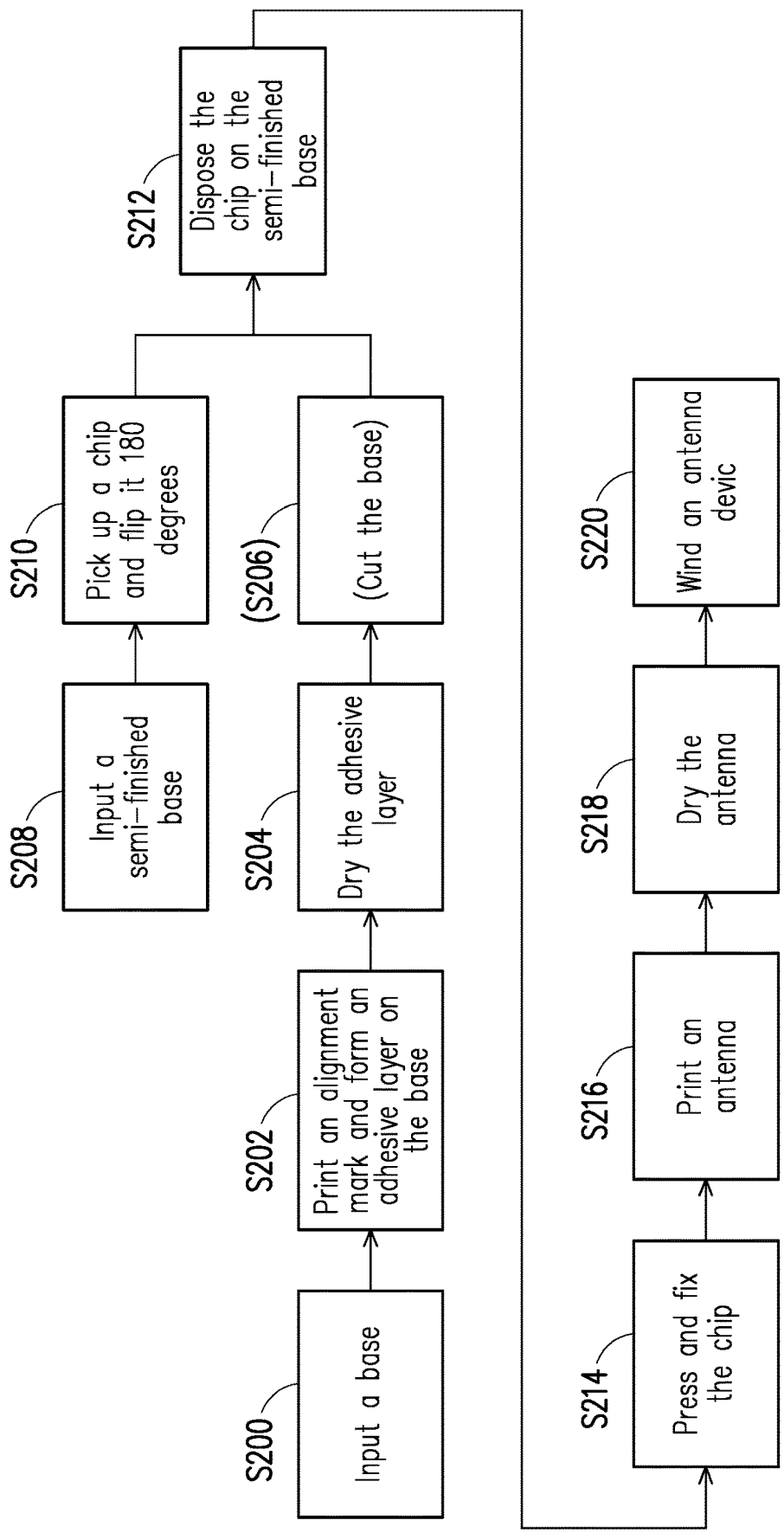
FIG. 11 is a flowchart of a manufacturing method of an antenna device according to the tenth embodiment of the invention.

FIG. 11 is a flowchart of a manufacturing method of an antenna device according to the tenth embodiment of the invention.

Please refer to FIG. 11, the difference between the manufacturing method of the tenth embodiment and the manufacturing method of the ninth embodiment is that in the manufacturing method of the tenth embodiment, the manufacturing process of the antenna device is performed in the same roll-to-roll machine. In other words, for example, steps S108, step S118, and S120 of the ninth embodiment may be omitted. In this way, process efficiency may be improved. For the part of the technical description omitted from step S200 to step S220, please refer to the related content of FIG. 8A, FIG. 9A, and FIG. 10A, which is not repeated herein.

Figure 12:
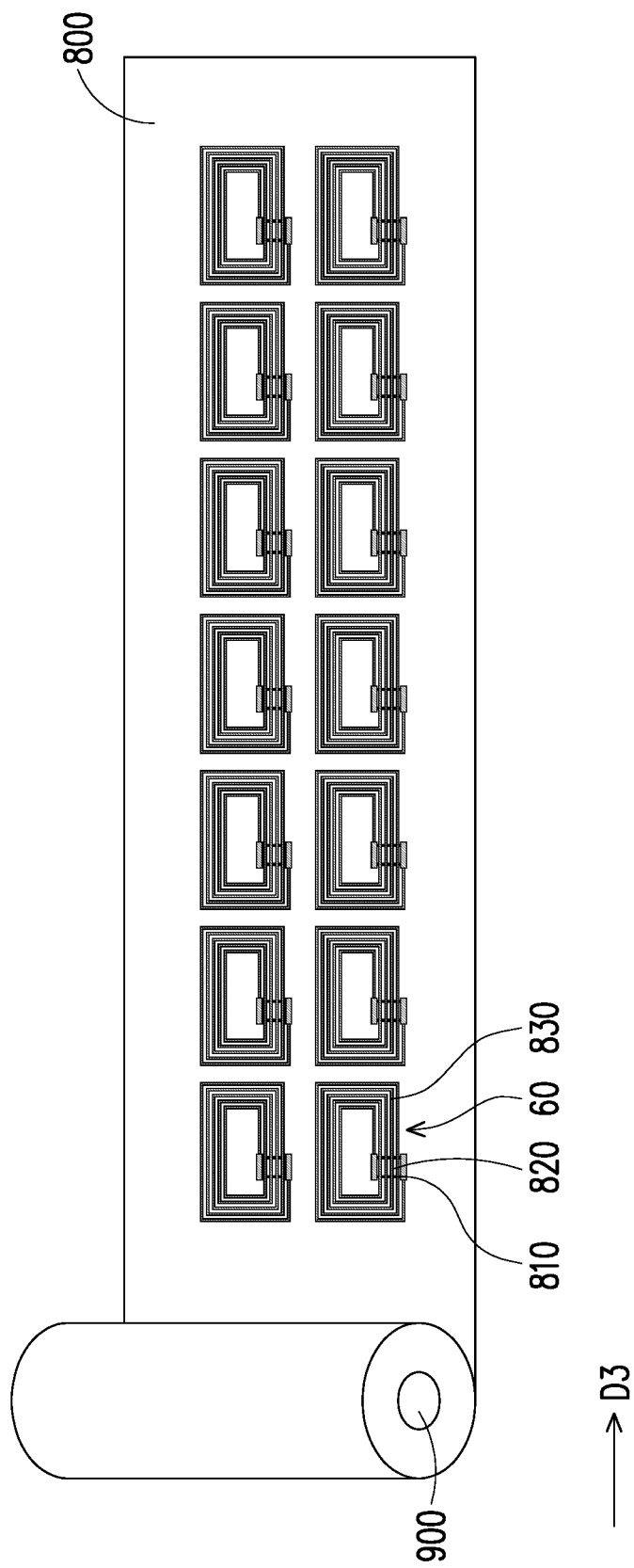
FIG. 12 is a three-dimensional diagram of a manufacturing method of an antenna device according to the eleventh embodiment of the invention.

FIG. 12 is a three-dimensional diagram of a manufacturing method of an antenna device according to the eleventh embodiment of the invention, wherein the same or similar components are represented by the same reference numerals as FIG. 8B, FIG. 9B, and FIG. 10B. In addition, the omitted portions of technical description, such as the size, material, function, etc. of each layer or area is as provided in the related content of FIG. 8B, FIG. 9B, and FIG. 10B, and therefore is not repeated herein.

Referring to FIG. 12, for example, the manufacturing method of the ninth embodiment or the manufacturing method of the tenth embodiment may be repeated to form a plurality of antenna devices 60 on the substrate. For example, step S102 or step S202 may be repeated during the substrate preparation step to form a plurality of adhesive layers on the substrate. Then, step S112 and step S114 or step S210 and step S212 are repeated during the chip placing step to place a plurality of chips on the adhesive layer. Then, in the antenna forming step, step S122 or step S216 is repeated to respectively form a plurality of antennas on the corresponding chips.

Based on the above, in the antenna device of the invention, the outermost coil and the innermost coil of the antenna are respectively disposed across the chip, so that the bonding between the antenna and the chip is less affected by the topography of a bonding surface such as the pads to prevent, for example, the antenna from being disconnected. In addition, in the manufacturing method of the antenna device of the invention, by placing the chip on the substrate in such a way that there is an included angle between the short side direction of the chip and the rolling direction of the receiving roller, in addition to making the force path of the chip shorter and the bending angle smaller, the yield of the antenna device may be further improved.

Although the invention has been described with reference to the above embodiments, it will be apparent to one of ordinary skill in the art that modifications to the described embodiments may be made without departing from the spirit of the invention. Accordingly, the scope of the invention is defined by the attached claims not by the above detailed descriptions.

What is claimed is:

1. An antenna device, comprising:
a substrate;
a chip disposed on the substrate, wherein the chip has at least two pads; and
an antenna disposed on the substrate, wherein the chip is located between the substrate and the antenna, and the antenna has a first bonding line segment and a second bonding line segment electrically connected to the at least two pads, respectively,
the first bonding line segment is located at an outermost coil of the antenna and is disposed across a short side direction of the chip in a manner of completely covering one of the at least two pads, and the second bonding line segment is located at an innermost coil of the antenna and is disposed across the short side direction of the chip in a manner of completely covering another of the at least two pads,
wherein the substrate further has a groove, there is an included angle between a sidewall of the groove and a bottom surface of the substrate, and the included angle is an acute angle.

2. The antenna device of claim 1, wherein a stamping density of the substrate located at the groove is greater than a stamping density of the substrate located at a periphery of the groove.

3. The antenna device of claim 1, wherein the chip is located in the groove, and the antenna is disposed across the groove,
a distance between a top surface of the at least two pads and the bottom surface of the substrate is set as H1, and a thickness of the substrate located outside the groove is set as H2, wherein a distance between the top surface of the at least two pads and a surface of the substrate |H1 −H2|≤5 µm.

4. The antenna device of claim 1, wherein the chip and the antenna are located in the groove,
a distance between a surface of the antenna located above the chip and the bottom surface of the substrate is set as H4, and a thickness of the substrate located outside the groove is set as H2, then a distance between the surface of the antenna and a surface of the substrate |H4−H2|≤5 µm.

5. The antenna device of claim 1, further comprising:
a protective layer disposed on the chip, wherein the protective layer covers at least a portion of the chip, the antenna, and the substrate, and an area of the protective layer is greater than an area of the groove.

6. The antenna device of claim 1, further comprising:
an isolation layer disposed between the chip and the antenna, wherein the isolation layer covers at least a portion of the chip, in a top view of the antenna device, a length of the isolation layer along the short side direction of the chip is greater than a width of the chip, and the isolation layer along a long side direction of the chip is not cover the first bonding line segment and the second bonding line segment of the antenna.

7. The antenna device of claim 1, further comprising:
an adhesive layer located between the substrate and the chip.

8. The antenna device of claim 7, further comprising:
an area of the adhesive layer is greater than an area of the chip,
the chip is embedded in a portion of the adhesive layer, so that a thickness of the adhesive layer located between the substrate and the chip is smaller than a thickness of the adhesive layer located at a periphery of the chip.

9. The antenna device of claim 1, wherein the substrate further comprises a groove,
the groove is adjacent to a short side of the chip and is separated from the chip by a distance,
a length of the groove is greater than or equal to a width of the chip.

10. The antenna device of claim 1, wherein the at least two pads comprise a first pad and a second pad,
the first pad is located on a short side of the chip, and the second pad is located on another short side of the chip,
the first bonding line segment completely covers the first pad, and the second bonding line segment completely covers the second pad.

11. An antenna device, comprising:
a substrate;
a chip disposed on the substrate, wherein the chip has at least two pads;
an antenna disposed on the substrate, wherein the chip is located between the substrate and the antenna, and the antenna has a first bonding line segment and a second bonding line segment electrically connected to the at least two pads, respectively,
the first bonding line segment is located at an outermost coil of the antenna and is disposed across a short side direction of the chip in a manner of completely covering one of the at least two pads, and the second bonding line segment is located at an innermost coil of the antenna and is disposed across the short side direction of the chip in a manner of completely covering another of the at least two pads; and
a printed layer located on the substrate,
the printed layer having an opening, wherein the chip is located in the opening, and a surface of the printed layer and an active surface of the chip are substantially coplanar.

12. A manufacturing method of an antenna device, comprising:
a substrate preparation step, forming a substrate;

a chip placing step, moving the substrate in a roll-to-roll manner, and placing the chip on the substrate, wherein the chip has at least two pads, there is an included angle between a short side direction of the chip and a moving direction of the substrate, and the included angle is less than or equal to 45 degrees; and an antenna forming step, forming an antenna on the substrate, wherein the chip is located between the substrate and the antenna, and the antenna has a first bonding line segment and a second bonding line segment electrically connected to the at least two pads, respectively, the first bonding line segment is located at an outermost coil of the antenna and is disposed across a short side direction of the chip in a manner of completely covering one of the at least two pads, and the second bonding line segment is located at an innermost coil of the antenna and is disposed across the short side direction of the chip in a manner of completely covering another of the at least two pads.

13. The manufacturing method of the antenna device of claim 12, wherein the substrate preparation step further comprises:

a groove forming step, forming a groove at a predetermined forming area corresponding to the chip or the antenna in the substrate, there is an included angle between a sidewall of the groove and a bottom surface of the substrate, and the included angle is an acute angle.

14. The manufacturing method of the antenna device of claim 12, further comprising, before the antenna forming step:

forming an isolation layer on the chip, wherein the isolation layer covers at least a portion of the chip, and in a top view of the antenna device, a length of isolation layer along the short side direction of the chip is greater than a width of the chip, and the isolation layer along a long side direction of the chip is not cover the first bonding line segment and the second bonding line segment of the antenna.

15. The manufacturing method of the antenna device of claim 12, wherein the substrate preparation step further comprises:

forming an adhesive layer on the substrate at a predetermined forming area corresponding to the chip.

16. The manufacturing method of the antenna device of claim 15, wherein an area of the adhesive layer is greater than an area of the chip, in the chip placing step, the chip is embedded in a portion of the adhesive layer, so that a thickness of the adhesive layer located between the substrate and the chip is smaller than a thickness of the adhesive layer located at a periphery of the chip.

17. The manufacturing method of the antenna device of claim 12, further comprising, after the substrate preparation step:

a printed layer forming step, forming a printed layer having an opening on the substrate, in the chip placing step, the chip is placed in the opening, and a surface of the printed layer and an active surface of the chip are substantially coplanar.

18. The manufacturing method of the antenna device of claim 12, wherein the substrate preparation step further comprises:

a groove forming step, forming a groove in the substrate adjacent to a short side of a predetermined forming area of the chip, and the groove is separated from the predetermined forming area by a distance.

19. The manufacturing method of the antenna device of claim 12, wherein the at least two pads comprise a first pad and a second pad, the first pad is located on a short side of the chip, and the second pad is located on another short side of the chip, the first bonding line segment and the second bonding line segment of the antenna completely cover the first pad and the second pad, respectively.

* * * * *